US011258511B2

(12) United States Patent
Saes et al.

(10) Patent No.: US 11,258,511 B2
(45) Date of Patent: Feb. 22, 2022

(54) SYSTEM AND METHOD FOR OPERATING AT LEAST ONE LED UNIT OF A LIGHTING GRID COMPRISING A PLURALITY OF LED UNITS

(71) Applicant: eldoLAB Holding B.V., Son en Breugel (NL)

(72) Inventors: Marc Saes, Son en Breugel (NL); Andy Johanna Elisabeth Otten, Wassenberg (DE)

(73) Assignee: eldoLAB Holding B.V., Son en Breugel (NL)

( * ) Notice: Subject to any disclaimer, the term of this patent is extended or adjusted under 35 U.S.C. 154(b) by 0 days.

(21) Appl. No.: 16/649,413

(22) PCT Filed: Oct. 5, 2018

(86) PCT No.: PCT/NL2018/050661
§ 371 (c)(1),
(2) Date: Mar. 20, 2020

(87) PCT Pub. No.: WO2019/070127
PCT Pub. Date: Apr. 11, 2019

(65) Prior Publication Data
US 2020/0287625 A1     Sep. 10, 2020

(30) Foreign Application Priority Data

Oct. 5, 2017  (NL) .................................... 2019673

(51) Int. Cl.
*H04B 10/00* (2013.01)
*H04B 10/116* (2013.01)
(Continued)

(52) U.S. Cl.
CPC ......... *H04B 10/116* (2013.01); *H04B 10/502* (2013.01); *H04B 10/66* (2013.01);
(Continued)

(58) Field of Classification Search
CPC .... H04B 10/116; H04B 10/502; H04B 10/66; H05B 45/22; H05B 45/12; H05B 47/195
(Continued)

(56) References Cited

U.S. PATENT DOCUMENTS 9,444,547 B2 *  9/2016  Ganick ................... G06Q 30/02
9,577,755 B2 *  2/2017  Jovicic ................... H04B 3/542
(Continued)

OTHER PUBLICATIONS

Netherlands Search Report for NL Application No. 2019673, dated Jun. 29, 2018, 20 pages.
(Continued)

*Primary Examiner* — Mohammad R Sedighian
(74) *Attorney, Agent, or Firm* — RatnerPrestia

(57) ABSTRACT

The present invention pertains to a system and method for operating at least one LED unit of lighting grid comprising a plurality of LED units, wherein the LED units are configured to transmit a VLC signal including a code word. A plurality of user equipment devices captures the light transmitted by the LED unit and determines parameters related to the light, such as a VLC quality parameter, flicker value, light intensity parameter and light colour parameter. Based on these parameters, a controller determines control parameters for the LED unit. As such, a feedback loop is created wherein the LED unit is controlled based on measurements with the user equipment devices.

27 Claims, 5 Drawing Sheets

(51) Int. Cl.
*H05B 45/22* (2020.01)
*H05B 47/195* (2020.01)
*H05B 45/12* (2020.01)
*H04B 10/50* (2013.01)
*H04B 10/66* (2013.01)

(52) U.S. Cl.
CPC ............ *H05B 45/12* (2020.01); *H05B 45/22* (2020.01); *H05B 47/195* (2020.01)

(58) Field of Classification Search
USPC ........................................................ 398/130
See application file for complete search history.

(56) References Cited

U.S. PATENT DOCUMENTS

| | | | |
|---|---|---|---|
| 2013/0069540 A1* | 3/2013 | Schenk | H05B 47/19 315/152 |
| 2015/0276399 A1 | 10/2015 | Breuer et al. | |
| 2015/0349884 A1 | 12/2015 | Bialic et al. | |
| 2015/0372753 A1* | 12/2015 | Jovicic | H04B 10/116 398/172 |

OTHER PUBLICATIONS

Sugiyama et al., "Brightness Control Methods for Illumination and Visible-Light Communication Systems", Proceedings of the Third International Conference on Wireless and Mobile Communications, 2007, 6 pages.

\* cited by examiner

SYSTEM AND METHOD FOR OPERATING AT LEAST ONE LED UNIT OF A LIGHTING GRID COMPRISING A PLURALITY OF LED UNITS

CROSS REFERENCE TO RELATED APPLICATIONS

This application is a U.S. National Phase Patent Application of International Application No. PCT/NL2018/050661, filed Oct. 5, 2018, which claims priority to Netherlands Application No. NL 2019673, filed Oct. 5, 2017, the disclosures of which are entirely incorporated herein by reference.

FIELD OF THE INVENTION

The invention pertains to a system comprising a lighting grid comprising a plurality of LED units which are adapted to emit light in an area wherein a plurality of user equipment devices are present, and a controller for assessing the lighting grid, as well as a method for operating said lighting grid, wherein feedback is provided via the plurality of user equipment devices.

BACKGROUND OF THE INVENTION

At present, conventional lighting applications are more and more replaced by Light Emitting Diode (LED) illumination systems. In general, LED based illumination can provide several advantages over conventional lighting applications, such as incandescent lamps or the like, as it enables an increased functionality and lower energy usage. For these reasons, LED based illumination is suitable for use in public and private environments, such as houses, supermarkets, offices, museums, warehouses, and industrial environments. In those environments the LED based illumination is usually provided in the form of a lighting grid comprising a plurality of LED units.

Another advantage provided by LED based illumination systems, is the possibility to include a transfer of data in the light via Visible Light Communication (VLC). The quality of said VLC is dependent on, among others, the modulation depth of the VLC signal. The larger said modulation depth, the easier it will be to decode the VLC signal. However, a larger modulation depth also entails more energy use and faster aging of the components. In particular, the application of a higher current, which may be required to obtain a larger modulation depth may cause an increased energy use and a faster aging. As such, a large modulation depth at a fixed average current causes more energy use and faster aging than a lower modulation depth at the same average current.

Furthermore, due to various factors, such as tolerances in production and/or parts or uneven use, one or more of the LED units of the lighting grid may age at a pace different from other LED units of the lighting grid. Since the characteristics of an LED, such as intensity and colour, are a function of said aging, this will result in a non-uniform light emitted by the various LED units in the lighting grid, which is unpleasant for the human observer.

Furthermore, due to VLC modulation, flicker may occur.

SUMMARY OF THE INVENTION

In view of the above, it is an object of the present invention to provide a system and a method for operating a lighting grid in order to address at least one of the issues identified above.

According to the invention, this object is achieved by a system, comprising
a lighting grid comprising
a plurality of LED units which are each adapted to emit light in an area wherein a plurality of user equipment devices are present, wherein the light emitted by each LED unit includes a VLC signal, wherein each LED unit is adapted to transmit data to the plurality of user equipment devices via the VLC signal,
a controller, which comprises
a communication terminal for receiving VLC quality parameters transmitted by the plurality of user equipment devices, wherein each VLC quality parameter corresponds with a LED unit of the plurality of LED units and represents the quality of data transmission via the VLC signal transmitted by that LED unit,
a processing unit, which is configured to determine a VLC control parameter for at least one LED unit for which a VLC quality parameter has been received, based on the corresponding VLC quality parameter,
wherein the controller is configured to adjust the VLC signal transmitted by the LED unit based on the corresponding VLC control parameters.

In an embodiment of the present invention, the processing unit is configured to determine a VLC control parameter for at least one LED unit for which multiple VLC quality parameters have been received, based on the corresponding multiple VLC quality parameters, wherein the controller is configured to adjust a VLC signal transmitted by the at least one LED unit based on the corresponding determined VLC control parameters.

Within the meaning of the present invention, a VLC quality parameter may e.g. include a parameter characterising a VLC transmission as perceived by a user equipment device, e.g. a smartphone or the like. Such a VLC quality parameter may e.g. include a decode rate as perceived by the user equipment device, the decode rate e.g. indicating a percentage of successful decoding of transmitted data. Alternatively or in addition, the VLC quality parameter may also include information associated with the amount of flicker as perceived by the user equipment device, colour information or intensity information characterising the light emitted by the LED unit.

In accordance with the invention, a system is provided. The system comprises a lighting grid comprising a plurality of LED units. Each LED unit may comprise one or more LED's, e.g. with a different light colour or intensity. In the LED unit, one or more LED drivers may be incorporated for driving the LED's. The lighting grid may be in a public or a private environment, such as a house, a supermarket, an office, a museum, a library, or an industrial environment such as a warehouse or a factory. The lighting grid may be spread over one or more spaces or rooms. The LED units of the lighting grid are each adapted to transmit data via a VLC signal, wherein said data optionally is or at least comprises a code word, e.g. by which the particular LED unit can be identified. The VLC signal is included in the light emitted by the LED unit.

The LED units emit light in an area, in which there is a plurality of user equipment devices. The user equipment devices are preferably mobile such that they move around relative to the lighting grid, and it can be any device which comprises a light capturing module, such as a camera, for capturing light emitted by a particular LED or LED unit. Each of the user equipment devices can be a mobile communication device such as a smartphone or tablet, but it can also be an individual physical entity, or it can be incorporated in another device. For example, in a supermarket, user equipment devices may be incorporated in a shopping cart or a scanning device with which the customer can scan barcodes of selected articles, in a museum it may be incorporated in a guiding or information device which provides information to the visitor, in an office it may be coupled to an identification tool such as a badge, in a warehouse it may be incorporated in a forklift, autonomous or automatically guided vehicle, or a drone, and in any industrial environment it may be coupled to any tool an operator is obliged to carry for safety or other reasons. The plurality of user equipment devices can include different types of user devices, e.g. multiple of the examples listed above.

Each user equipment device comprises a processing unit. The processing unit is configured to decode the VLC signal transmitted by the LED units for which the emitted light is captured by the light capturing module. Thus, each user equipment device is configured to receive the VLC signal transmitted by the LED units and decode it, out of the captured light.

The processing unit of each user equipment device is further configured to determine for at least one LED unit a VLC quality parameter. The VLC quality parameter represents the quality of transmission of data via the VLC signal transmitted by said LED unit. Thus, each VLC quality parameter corresponds with a particular LED unit. The quality of the data transmission via VLC is dependent on several factors, such a modulation depth of the signal, intensity of the light, surrounding light, the components of the user equipment device, etc.

The user equipment devices further comprise an output terminal, which is adapted for transmitting the VLC quality parameters.

As such, in an embodiment, the user equipment devices that displace or move relative to the lighting grid may transmit, via their output terminals, VLC quality parameters associated with the LED units of which they receive light, in particular modulated light comprising a VLC signal. As such, a particular user equipment device may, when moving from a first position near a first LED unit to a position near a second LED unit, transmit, at a first instant, a first VLC quality parameter associated with the first LED unit, and transmit, at a second instant, a second VLC quality parameter associated with a second LED unit, etc.

The system according to the invention further comprises a controller. The controller may be an individual physical entity, or it may be incorporated in one or more devices which have processing power, such as a computer, print board or a programmable logic controller (PLC). The controller can be, but does not need to be, on the same physical location as the lighting grid, as is explained in more detail below. The controller according to the invention comprises a communication terminal. Via the communication terminal, the controller is configured to receive the one or more VLC quality parameters as transmitted by each of the user equipment devices.

As such, in an embodiment, the controller may receive, during use, a substantially continuous stream of data corresponding to the VLC quality parameters that are transmitted by the user equipment devices that are present in the area that is illuminated by the lighting grid. As an example, the lighting grid may be used to illuminate an area of a supermarket and comprises e.g. 100 LED units. Assuming further that, during use, 25 customers are e.g. present in the supermarket, the customers being equipped with user equipment devices, e.g. smartphones, that transmit, while the customers travel through the supermarket, VLC quality parameters of the LED units in their vicinity. In such an arrangement, due to the customers travelling, the controller may gather VLC quality parameters, in particular multiple VLC quality parameters, from the different user equipment devices. In particular, the controller may receive, for a particular LED unit, one or more VLC quality parameters from a first user equipment at a first instant in time and one or more VLC quality parameters from a second user equipment at a second, later, instant in time, and so on. As such, when the lighting grid has been in operation for a while, the controller may have gathered multiple VLC quality parameters for most of the LED units of the lighting grid. The communication between the user equipment devices and the controller is preferably wireless and may use any suitable technique, such as Wi-Fi, 4G or 3G. If the controller is in the physical vicinity of the user equipment devices, communication methods such as Bluetooth, IR wireless communication, VLC or Zigbee can also be used. In some embodiments, a combination of communication techniques may be used, and possibly an intermediate station is used. For example, the user equipment devices may use Bluetooth to send the information to an intermediate computer which is located in vicinity of the lighting grid, which in turn sends the information to the remote controller.

The controller according to the invention further comprises a processing unit. The processing unit of the controller is configured to determine a VLC control parameter for at least one but preferably each LED unit for which multiple VLC quality parameters have been received. The VLC control parameter is based on the received VLC quality parameters. The VLC control parameter can be determined based on the VLC quality parameters received at that moment, but it is also possible to base the VLC control parameter on the history of VLC quality parameters of the LED unit, in order to avoid that one faulty measurement results in major changes of the VLC signal.

The VLC quality parameters are matched with an actual LED unit of the lighting grid based, for example on the code word when present, or based on the location of the user equipment device. It should be noted that it is not relevant whether said matching is done by the processing units of the user equipment devices or by the processing unit of the controller.

Based on the VLC control parameter, the controller is configured to control the LED units, by adjusting VLC signal transmitted by the LED units based on the corresponding VLC control parameters. In other words, the controller is configured to set one or more characteristics of the VLC signal as transmitted by a LED unit. The VLC control parameter as determined may e.g. relate to a modulation depth that is to be applied. Alternatively or in addition, the VLC control parameter may also relate to a required colour or intensity, e.g. an average intensity that needs to be generated.

Thus, the system according to the invention enables to adjust the VLC signal based on the quality of the VLC signal, as perceived by the user equipment devices. As such, a feedback loop is created with real-time information, which allows to adjust the signal on the actual situation. This allows to obtain a desired quality of data transmission, which is adjusted to the environment, without the need of implementing safety margins. The system receives from the plurality of user equipment devices a plurality of VLC quality parameters, which increases the accuracy and allows to faster obtain VLC quality parameters for more LED units of the plurality of LED units of the lighting grid. A further advantage is that the system can adjust the VLC control system on real time feedback, which allows to introduce new types of user equipment devices, since the system automatically adjusts accordingly. Furthermore, it enables to detect when one of the user equipment devices provides VLC quality parameters that diverge from those provided by the other user equipment devices, which may for example indicate an erroneous measurement or other error.

It can further be pointed out that, as is clear from the above, the VLC quality parameters are gathered or received by the controller during normal operation of the lighting grid, i.e. not during an initialisation or calibration of the lighting grid. Further, in accordance with an embodiment of the present invention, there is no need to make use of a dedicated sensor to perform the quality assessment; the quality assessment is made based on measurements performed by user equipment devices such as smartphones, tablets or the like.

It can further be pointed out that, because the controller can receive, in a substantially continuous manner, VLC quality parameters of the LED units, during normal operation or use of the lighting grid, a substantially continuous improvement or adjustment of the operating parameters of the LED units, in particular the VLC related operating parameters of the LED units of the lighting grid. As such, variations in the operating characteristics of the individual LED units, e.g. caused by aging effects, or thermal effects, may be anticipated comparatively fast, in real-time. In contrast, when a lighting grid is e.g. periodically calibrated, such effects are only alleviated periodically, e.g. once a year.

As such, the lighting grid according to the present invention need not be subjected to a detailed calibration, it can be brought into operation more quickly, compared to conventional lighting grids that need to be calibrated first. It can further be noted that the calibration of such a conventional lighting grid may require dedicated, costly hardware to perform the time-consuming calibration. In the present invention, the substantially continuous improvement or adjustment of the lighting grid does not require particular hardware from the lighting grid manufacturer. In fact, the substantially continuous improvement or adjustment of the lighting grid relies on measurements performed by user equipment devices, i.e. devices that are not supplied or controlled by the manufacturer of the lighting grid.

In a possible embodiment of the system according to the invention, each LED unit transmits in the data in the VLC signal at least a code word, wherein optionally the particular LED unit can be identified by the code word it transmits, The LED units are configured to transmit the code words repeatedly. In this embodiment, the processing unit of each user equipment device is configured to determine the VLC quality parameter based on a frequency of successful decoding of the respective code word. For example, the VLC quality parameter may be a value between 0-1, wherein 1 corresponds with 100% of successful code words decoded, and 0 with 0%. Thus, in this embodiment it is considered that the quality of data transmission via the VLC signal is reflected in the ability of the user equipment devices to decode the code word. As such, the VLC signal can be adjusted such that the user equipment devices are able to decode the code word as desired.

In a possible embodiment, each LED unit can be identified by the code word it transmits, for example because the code word is unique for each LED unit in the lighting grid or part of the lighting grid. The code word can thus be used to match the VLC quality parameter, or other parameters, to the LED unit. Said matching can be done by the processing unit of the user equipment device, or the processing unit of the controller.

In a possible embodiment of the system according to the invention, the LED units are configured to transmit the VLC signal by changing the intensity of the emitted light. Said emitted light may comprise at least a high level and a low level of intensity, which can be recognized by the user equipment devices and based on which the code words can be communicated. The code words can e.g. be defined by the length of a high or low level, or by the sequence of high and low levels. The difference in intensity between said high level and low level is defined as the modulation depth. In this embodiment, the controller of the system is configured to control the modulation depth by the VLC control parameter. Thus, based on the VLC quality parameter, the modulation depth can be adjusted.

In a possible further embodiment of the system according to the invention, the processing unit of the controller is configured to determine to VLC control parameter such that the modulation depth of the VLC signal is minimized while maintaining the VLC quality parameter above a predetermined level. At the predetermined level at least a predetermined percentage of user equipment devices is able to decode the code word, wherein the predetermined percentage preferably is at least 90%, more preferably at least 95%.

In general, a larger modulation depth will enhance the ability of the user equipment devices to decode the VLC signal. However, at the same time this entails that higher currents, or at least larger differences between a high current and a low current, flow through the LED and other related components. As a result thereof, more energy is used and the components age faster. Hence, a trade-off must be made between these factors. In this possible embodiment according to the invention, the modulation depth is kept small. Therefore, lower currents, or at least smaller differences between the low and high currents, flow through the LED unit and other components. This results in less use of energy, as well as less aging of the components. Meanwhile, the feedback from the user equipment devices enables to ensure that the VLC signal is still decodable. Once the VLC quality parameter indicates that the VLC signal is no longer decodable by too many of the user equipment devices, the controller can increase the modulation depth of the concerning LED unit. This embodiment of the system has the advantage that the modulation depth can be minimized for lighting grids on locations from which the characteristics are unknown in advance. The feedback from the user equipment devices allows for optimizing the parameters based on the actual situation. Furthermore, the modulation depth can be increased when, e.g. due to aging of the LED unit, the quality of the data transmission decreases. This allows to always maintain the modulation depth as low as possible, instead of needing to incorporate some sort of safety margin for aging or other factors.

In a possible embodiment of the system according to the invention, the controller is adapted to receive via the communication terminal a flicker value from the user equipment device. The processing unit of each user equipment device is adapted to determine the flicker value for the LED unit. In this context, flicker is considered to be the changing of intensity of light. Flicker may occur as a consequence of the VLC signal, for example because the difference between the high level and the low level of the intensity in the emitted light is too large, or because the changes in high level and low level are in a frequency range that is visible. In case the flicker becomes visible to the human eye, this will be perceived as unpleasant. The flicker value is transmitted to the controller, via the output terminals of the user equipment devices to the communication terminal of the controller. The processing unit of the controller further is therefore adapted to determine the VLC control parameter, and thus the modulation depth, based also on the flicker values, with the object to avoid flicker which is visible to the human eye. Optionally, it is also an object to avoid flicker which is visible for a camera. For example, the processing unit of the controller may adjust the VLC control parameter such that the modulation depth is decreased, or that the frequency of the changes between high level and low level is adjusted.

In a possible embodiment of the system according to the invention, the controller is used for controlling characteristics of the light emitted by the particular LED unit, in particular intensity. The processing unit of each user equipment device is then adapted to determine, for at least one LED unit for which light is captured by the light capturing module, a light intensity parameter. The light intensity parameter represents the intensity of the light transmitted by the LED unit. The user equipment devices are configured to transmit the light intensity parameter from the output terminal to the communication terminal of the controller. The processing unit of said controller is configured to compare the light intensity parameter with an intensity reference value, and based on this comparison determine an intensity control parameter for at least one but preferably each LED unit for which a light intensity parameter has been received. The controller is then configured to control the LED units based on the respective control parameters. The intensity reference value represents a desired intensity for the light emitted by the LED units. As such, this embodiment enables to control the intensity of the emitted light based on feedback from the user equipment devices. Based on this feedback, the intensity of each LED unit can be adapted until it finally converges to the desired intensity, which is e.g. a uniform intensity that is pleasant to the human observer. Since the intensity of the light emitted by the LED unit is dependent on the forward current over the LED unit, the intensity control parameter can represent an adjusted forward current over the LED unit.

In a possible embodiment, the user equipment devices are configured to recognize in a captured image the nodes with the highest intensity of light, which represent a LED unit, and for which the light intensity parameters can be determined. It should be noted that each light intensity parameter can be matched to a LED unit from the lighting grid based on the position of the particular user equipment device, which in turn can e.g. be determined based on the decoded code words. It is not essential for the current invention whether said matching is done by the processing units of the equipment devices or by the processing unit of the controller.

In a possible embodiment, the intensity reference value is a predetermined value. As such, the intensity of the light can converge to a predetermined desired value.

In a possible embodiment, the intensity reference value for a LED unit is the light intensity value of the neighbouring LED unit. As such, the light of all the LED units can be made uniform with the neighbouring LED unit, until all LED units of the lighting grid or a part of the lighting grid emit uniform light.

In a possible embodiment, the processing unit of the controller is configured to determine the intensity reference value based on the light intensity parameters of multiple LED units of the lighting grid. Thus, the controller first determines the light intensity parameters of multiple LED units of the lighting grid. Based on this, the intensity reference value is determined. It should be noted that the light intensity parameters of the other LED units can be obtained from another user equipment device. For example, the intensity reference value may be determined based on the average of the light intensity parameter of multiple LED units. The multiple LED units can be defined as all LED units of the lighting grid, but it is also possible to divide the lighting grids is subgroups, or it is possible to determine an individual set of LED units for determining the intensity reference value of each LED unit, wherein the individual set is based on the LED units in the vicinity of the respective LED unit, or any combination of the aforementioned can be applied. It is also possible to detect when the light intensity parameter of a LED unit is an outlier, such that this value can be disregarded when determining the intensity reference value.

In a possible embodiment, the intensity reference value based on the total light captured by one or more of the user equipment devices. Thus, the intensity reference value may represent the average intensity at a certain location.

In these embodiments, the light emitted by the LED unit is regulated to be uniform with the other LED units and/or the surrounding light. Thus, a relative uniformity is pursued, meaning that the object is to control the light of any LED unit to be uniform relative to the rest of the present light, rather than controlling the light to pursue an absolute value of intensity. Since the intensity reference value in this embodiment is based on the light that is already emitted, this embodiment can be used to regulate the light emitted by the multiple LED units to be uniform, which will be perceived as pleasant by the human observer.

In a possible embodiment of the system according to the invention, the controller is used for controlling characteristics of the light emitted by the particular LED unit, in particular colour. The processing unit of each user equipment device is then adapted to determine, for at least one LED unit for which light is captured by the light capturing module, a light colour parameter. The light colour parameter represents the colour of the light transmitted by the LED unit. The user equipment devices are configured to transmit the light colour parameters from the output terminal to the communication terminal of the controller. The processing unit of said controller is configured to compare the light colour parameters with a colour reference value, and based on this determine an colour control parameter for at least one and preferably each LED unit for which a light colour parameter has been received. The controller is then configured to control the LED units based on the respective control parameters. The colour reference value represents a desired colour for the light emitted by the LED units. As such, this embodiment enables to control the colour of the emitted light based on feedback from the user equipment devices. Based on this feedback, the colour of each LED unit can be adapted until in finally converges to the desired colour. The colour of a LED unit can be controlled if the LED unit comprises multiple LED's which emit light of a different colour. The colour can then be controlled by controlling the intensity per LED of the LED unit by controlling the forward current over said LED.

In a possible embodiment, each user equipment device is configured to recognize in a captured image the nodes with the highest intensity of light, which represent a LED unit, and for which the light colour parameters can be determined. It should be noted that each light colour parameter can be matched to a LED unit from the lighting grid based on the position of the particular user equipment device, which in turn can e.g. be determined based on the decoded code words. It is not relevant for the current invention whether said matching is done by the processing units of the equipment devices or by the processing unit of the controller.

In a possible embodiment, the colour reference value is a predetermined value. As such, the colour of the light can converge to a predetermined desired value.

In a possible embodiment, the processing unit of the controller is configured to determine the colour reference value based on the light colour parameter of multiple LED units of the lighting grid. Thus, the controller first determines the light colour parameter of multiple LED units of the lighting grid. Based on this, the colour reference value is determined. It should be noted that the light colour parameters of the other LED units can be obtained from the same user equipment device or from one or more other user equipment devices. For example, the colour reference value may be determined based on the average of the light colour parameter of multiple LED units. The multiple LED units can be defined as all LED units of the lighting grid, but it is also possible to divide the lighting grids is subgroups, or it is possible to determine an individual set of LED units for determining the colour reference value of each LED unit, wherein the individual set is based on the LED units in the vicinity of the respective LED unit, or any combination of the aforementioned can be applied. It is also possible to detect when the light intensity parameter and/or light colour parameter of a LED unit is an outlier, such that this value can be disregarded when determining the colour reference value.

In a possible embodiment, the colour reference value is based on the total light captured by one or more user equipment devices. Thus, the colour reference value may represent the average colour at a certain location.

In these embodiments, the light emitted by the LED unit is regulated to be uniform with the other LED units and/or the surrounding light. Thus, a relative uniformity is pursued, meaning that the object is to control the light of any LED unit to be uniform relative to the rest of the present light, rather than controlling the light to pursue an absolute value of colour. Since the colour reference value in this embodiment is based on the light that is already emitted, this embodiment can be used to regulate the light emitted by the multiple LED units to be uniform, which will be perceived as pleasant by the human observer.

As mentioned, in an embodiment of the present invention, the controller is used for controlling characteristics of the light emitted by the particular LED unit. Such characteristics of the light may also be referred to as operating parameters characterising the light as emitted by the particular LED unit. Such operating parameters or characteristics of the light as emitted may e.g. include, as discussed above, the flicker as generated by the LED unit, the intensity of the light as generated by the LED unit and the colour of the light as generated by the LED unit.

In such embodiment, the controller may thus be configured to receive, via the communication terminal, from each user equipment device information regarding an operating parameter characterizing the light emitted by a LED unit. Such information may e.g. be included in a signal, referred to as an operating parameter signal characterising the particular operating parameter of the LED unit as perceived by the user equipment device. Such an operating parameter signal may e.g. be transmitted by the user equipment device in a similar manner as the VLC quality parameter is transmitted. Based on this information characterizing the particular operating parameter, the processing unit of the controller may then determine the VLC control parameter such that, when the particular LED unit applies the VLC control parameter, the LED unit will operate or will start operating in such manner that the operating parameter is within a predetermined range or below a predetermined level. In such embodiment, the VLC control parameter may thus include both information to control the VLC mode of operation of the LED unit and an additional operating parameter or characteristic, e.g. a flicker value, an intensity or a colour.

In this respect, it can be pointed out that the measured operating parameters and/or VLC quality parameter may not only reflect deviations from a desired situation (e.g. a deviating intensity or colour or a decoding rate which is too low) that are caused by driving the LEDs but may also contain deviations due to a spread in the measurements due to an inaccuracy of the user equipment devices. In order to anticipate on the contribution to the measurements due to inaccuracies of the user equipment devices, an averaging of the received operating parameters over the population of user equipment devices may be applied, thereby averaging out the inaccuracy of each individual user equipment device.

Such an averaging of the received data, i.e. the VLC quality parameters or operating parameters may also be useful for saving memory. By e.g. storing an average value of e.g. the last N VLC quality parameters rather than the N parameters, less memory is required to store the information received from the user equipment devices.

Further, in an embodiment, the operating parameters and/or VLC quality parameters considered to determine the VLC control parameter may be limited to the last M measurements received or to measurements received during a particular period, e.g. the last month or the last week or may be limited to the last X user equipment devices that have provided measurement data.

As an example, as already indicated above, the user equipment devices can be configured to transmit a signal to the controller, whereby the signal includes information on the amount of flicker of the emitted light, the intensity of the emitted light and/or the colour of the emitted light, in addition to the information on the VLC quality, i.e. the VLC quality parameter.

In such embodiment, the controller of the lighting grid according to the present invention may e.g. be configured to control a modulation depth as applied during a VLC transmission and, at the same time, control the flicker, intensity and/or colour of the light as generated. In such embodiment, the controller of the lighting grid according to the present invention may provide in a substantially continuous optimization of the aforementioned trade-off between ensuring that there is a sufficient success rate in decoded transmitted VLC data and at the same time ensuring that other operating parameters such as flicker, intensity or colour are within desired boundaries.

In particular, in an embodiment, the controller may be configured to minimize the modulation depth of the VLC signal while maintaining the quality of the transmission of data via the VLC signal as represented by the VLC quality parameter above a predetermined level. In such embodiment, the processing unit of the controller may be configured to determine the VLC control parameter such that the modulation depth of the VLC signal is minimized while maintaining the quality of the transmission of data via the VLC signal as represented by the VLC quality parameter above a predetermined level, wherein at the predetermined level a predetermined percentage of user equipment devices is able to decode the code word, wherein the predetermined percentage preferably is at least 90%, more preferably at least 95%.

In a possible embodiment according to the invention, the processing unit of the controller is adapted to detect a subgroup of the LED units of the lighting grid for which the VLC control parameter and/or intensity and/or colour control parameter should deviate from the rest of the LED units of the lighting grid. This can for example be desirable for LED units which are located close to a window, through which day light enters. By harvesting the daylight, these LED units can be controlled to have a lower intensity and another colour such that the overall light is perceived as uniform with the rest of the lighting grid by the human observer. The processing unit may detect such a subgroup based on the geographical position of the LED units, or by detecting that the intensity and/or colour quality parameter of those LED units deviate from the intensity and/or colour reference value respectively.

A subgroup of LED units may also deviate from the rest of the lighting grid because the visibility in that specific area differs from the rest of the lighting grid. For example, there may be more dust which results in a lower intensity of the light as perceived by the user equipment devices, as well as the human observer. In such a case, those specific LED units may be controlled to emit light with a higher intensity. For such a subgroup, the VLC quality parameter may also be affected by the exterior factors. However, the system according to the invention will adjust the VLC signal accordingly such that the VLC quality parameter converges to the desired value.

In a possible embodiment according to the invention, the controller is further adapted to receive from each user equipment device, via the communication terminal, type information representing the type of the user equipment device. In this context, a type can for example refer to a certain model of smartphone or tablet. The mean characteristics of the user equipment device can be determined by the design of the type of the user equipment device, i.e. the used components and/or software. This design can cause deviations from the mean behaviour of all types of user equipment devices, which deviations are systematic for a certain type of user equipment device.

A first aspect in which the type information can be used pertains to the VLC quality parameter and/or the VLC control parameter. The ability of any user equipment device to decode the VLC quality parameter is dependent on the user equipment device itself, i.e. the components and/or software used. Depending on the application of the system according to the invention, it may be desired that all types of user equipment devices are able to decode the VLC signal. Therefore, it should be ensured that the modulation depth is not reduced too much based on measurements of a user equipment device that has a good VLC decoding ability. For example, imagine a certain type has a good ability to decode the VLC signal. The VLC quality parameter determined by this user equipment device will then generally be relatively high. If the type of user equipment device would not be taken into account, the controller of the system may then reduce the modulation depth so much, that another type of user equipment device is not able to determine the code word of the LED unit from the VLC signal. By taken the type information into account, this is avoided. For example, the VLC quality parameter as obtained by the user equipment device may be adjusted based on the type of user equipment device before the processing unit of the controller determines the VLC control parameter.

A second aspect in which the type information can be used pertains to the intensity and/or colour of the emitted light. Each type of user equipment device may have a different result of the measurement of captured light, based again on components and/or software used, resulting in a different light intensity parameter and/or light colour parameter. For example, the intensity of the light according to a certain type of user equipment device may deviate from another type of user equipment device. The processing unit of the controller can then adjust the light intensity parameter and/or light colour parameter by a weighting factor, wherein the weighting factor is based on the type information. As such, the systematic deviations from the mean behaviour of all user equipment devices, which are based on the design and model of the user equipment device, are taken into account.

In a possible embodiment of the system according to the invention, the controller is further adapted to receive from each user equipment device, via the communication terminal, instance information representing the instance of the user equipment device. In this context, any user equipment device is an instance of a certain type of user equipment device. For example, an instance can be a certain specimen of a certain model of smartphone or tablet. Stochastic deviations are based on per specimen properties, e.g. because of tolerances on used components such as a camera or resistor. The instance information can be applied in a manner similar to the type information. As such, the stochastic deviations from the mean behaviour of all user equipment devices, which are e.g. based on tolerances of used components in the user equipment device, are taken into account. In an optional further embodiment, the stochastic deviations for a certain instance are determined based on previous measurements by said instance, wherein these measurements are compared to those of other instances of the same type.

The manner in which the type information and/or the instance information is taken into account, i.e. the difference in ability to decode and/or the weighing factors, may be stored in a memory in the controller, or may be provided by communication between the controller and a database, optionally remote. In a possible embodiment, the processing unit controller is adapted to detect, based on type and/or instance information received from the user equipment device, when such information regarding the specific user equipment device is not known or available. The controller is then further adapted to compare the VLC quality parameter and/or the light intensity parameter and/or the light colour parameter with the respective parameters recently determined by other types and/or instances of user equipment devices. The processing unit is then adapted to determine an ability to decode the VLC signal and/or a weighting factor for the unknown type, based on said comparison. This may be adjusted over time as more data determined by said type and/or instance becomes available. It should be noted that it may be advantageous to provide a central database wherein measurements and parameters by various user equipment devices across various locations and lighting grids are stored, since this additional data allows for faster and more accurate determination of the factors specific to a type of user device, such as the ability to decode the VLC signal and the weighing factors for intensity and colour.

In a possible embodiment of the system according to the invention, the controller further comprises a memory. In said memory, at least one of the VLC quality parameter, VLC control parameter, light intensity parameter, intensity control parameter, light colour parameter and colour intensity parameter is stored for each LED unit. Based on those stored values, the processing unit is adapted to determine for each LED unit when the LED unit should be replaced. For example, the processing unit can determine a responsivity value. The responsivity value represents the responsivity of said LED unit to one of the control parameters. As such, the processing unit can detect when a LED unit is not responding sufficiently to the control parameter, for example when the LED unit is unable to reach the desired modulation depth, intensity or colour. This may indicate that the LED unit has aged, and must be replaced. As another example, the processing unit can also determine a ratio, e.g. of the VLC quality parameter over the modulation depth as controlled, or the light intensity parameter over the current through the LED unit as controlled, or of the light colour parameter over the colour as controlled. Once one or more of these ratios fall below a certain threshold, this may indicate aging of the LED unit.

In a further possible embodiment, the controller is further adapted to then output a signal to an operator representing a replacement order, e.g. via an indication light on a monitor or a notification on an operator information device. This can be done to an operator of the establishment in which the lighting grid is located, or to an operator of a third party which manages the system according to the invention. In the latter case, the replacement order may be represented on a location other than where the lighting grid is located.

In case the system according to the invention is configured to control multiple parameters of one LED unit, such as the VLC signal, the flicker value, the light intensity and the light colour, the respective control parameters may be conflicting. For example, the flicker value may indicate that the modulation depth should be decreased, while the VLC quality parameter indicates that the modulation depth should be increased. In such case, the processing unit of the controller can be adapted to determine multiple control parameters, or it can be adapted to determine a single control parameter which represents the control of all characteristics to be controlled. In case a single control parameter is to be determined, the processing unit may in a further possible embodiment be adapted to apply a fuzzy control algorithm to do so. Using a fuzzy control algorithm allows to find the control parameter which best satisfies the multiple objects, i.e. modulation depth, intensity, colour, etc., based on the feedback that is received via the communication with user equipment device.

In theory, the optimal situation is reached when the lighting grid provides sufficient light, being the basic function of the lighting grid; and the colour of the light is correct; and the VLC signal is decodable by all relevant user equipment devices; and there is no flicker that can be observed by the human observer of by a camera; and the colour and the intensity of the light are uniform over the lighting grid.

In a possible embodiment of the system according to the invention, the plurality of user equipment devices are mobile communication devices comprising an installed mobile application. For example, the user equipment devices may be smartphones and/or tables. The mobile application is a software-based application which can run on the mobile communication device.

The mobile application is configured to cause the mobile communication device to capture the light emitted by the LED units with the light capturing module of the mobile communication device, and is further configured to decode the code words transmitted by the LED units for which the emitted light is captured by the light capturing module. Thus, the mobile application is configured to enable the VLC communication from the LED units to the mobile communication device.

The mobile application is further configured to provide information to a user on a display of the mobile communication device. The information is related to an environment or area wherein the lighting grid is arranged, and the information is based on a determined location of the mobile communication device. Said determined location is determined based on the decoded code words. Thus, based on the decoded code words, it can be determined of which LED units light is captured by the mobile communication device, and as such the location of the mobile communication device. It is not of importance for the invention whether this location is determined by the processing unit of the mobile communication device or another processing unit, for example of the controller, wherein the code words are transmitted by the mobile communication device to the controller. Based on the determined location, the user of the mobile communication device is provided with information. For example, if the user is in a supermarket, such information can relate to the information or promotions of products in the vicinity, or it can guide the user through the supermarket based on a shopping list. If the user is in a museum, the information can relate to works of art in the vicinity of the user. The information can be stored on the mobile communication device via the mobile application, or it can be provided at that moment, e.g. from a remote database. Communication with such a database can be via conventional wireless communication means such as WiFi Mobile internet such as 3G or 4G, or Bluetooth, but it may also be possible to provide the information via the VLC communication.

The mobile application is further configured to determine for the at least one LED unit the VLC quality parameter which represents the quality of the transmission of data via the VLC signal transmitted by said LED unit, and cause the mobile communication device to transmit the VLC quality parameter via the output terminal.

In this embodiment, the mobile application is running on the mobile communication device of a user, and provides the user with information. This is the primary function of the mobile application. However, the mobile application is configured to meanwhile determine characteristics of the VLC communication, and provide feedback thereof to the controller by transmitting this via the output terminal. As such, the controller can control the LED units appropriately. Since the system comprises a plurality of mobile communication devices, the controller is provided with sufficient real-time information to fine-tune the control of the LED unit. For example, the modulation depth can be minimized while in real-time receiving information when one or more mobile communication devices is not able to decode the code word in the VLC signal. As such, the modulation depth can be kept at the minimal level that is actually required at any given moment, thereby minimizing energy use and aging of components. In case aging of components or other factors affect the VLC communication, the feedback loop in the system ensures that the controller adjusts for those factors.

Although the system according to the invention as described so far relates the lighting grid and the controller, in a possible embodiment according to the invention the user equipment devices also are part of the system.

The invention further relates to the mobile application that is installed on the mobile communication device in the aforementioned embodiment. Thus, the invention relates to a mobile application for a mobile communication device, wherein the mobile application is configured to:

cause the mobile communication device to capture the
light emitted by the LED units with the light capturing
module of the mobile communication device,
decode the code words transmitted by the LED units from
which the emitted light is captured by the light capturing module,
provide information to a user on a display of the mobile
communication device, wherein said information is
related to an environment wherein the lighting grid is
arranged, and wherein said information is based on a
determined location of the mobile communication
device, which determined location is determined based
on the decoded code words,
determine for the at least one LED unit the VLC quality
parameter which represents the quality of the transmission of data via the VLC signal transmitted by said
LED unit, and
cause the mobile communication device to transmit the
VLC quality parameter via the output terminal.

The invention further relates to a method for operating at least one LED unit of a lighting grid comprising a plurality of LED units, comprising the steps of:
emitting light with the LED unit including a VLC signal
to transmit data via the VLC signal,
capturing the light emitted by the LED unit with light
capturing modules of a plurality of user equipment
devices,
decoding with each user equipment device the VLC signal
transmitted by the LED unit from the light captured by
the light capturing module of the particular user equipment device,
determining with each user equipment device for the LED
unit a VLC quality parameter which represents the
quality of the transmission of data via the VLC signal
transmitted by said LED unit,
determining a VLC control parameter for the LED unit,
based on said VLC quality parameters,
adjusting the VLC signal transmitted by the LED unit
based on the VLC control parameter.

The method according to the invention can optionally be carried out using the system according to the invention. The terms used in relation to the method according to the invention therefore have the same meaning as in relation to the system according to the invention.

In a possible embodiment of the method according to the invention, the method further comprises the steps of:
transmitting a code word repeatedly in the VLC signal
included in light emitted by the LED unit,
determining the VLC quality parameters for the LED unit
based on a frequency of successful decoding of the
respective code word by the particular user equipment
device,
determining the VLC control parameter such that a modulation depth of the VLC signal is minimized while
maintaining the quality of the transmission of data via
the VLC signal above a predetermined level as represented by the VLC quality parameter, wherein at the
predetermined level a predetermined percentage of user
equipment devices is able to decode the code word,
wherein the predetermined percentage preferably is at
least 90%, more preferably at least 95%.

In a possible embodiment of the method according to the invention, the method further comprises the step of determining a flicker value for the light emitted by the LED unit. In this embodiment, the step of determining the VLC control parameter is further based on the flicker value, such that the flicker value is below a predetermined level that represents the visibility of flicker to a human eye and/or to a camera.

In a possible embodiment of the method according to the invention, the method further comprises the steps of:
determining with each user equipment device from the
captured light from the LED unit a light intensity
parameter which represents the intensity of the light
transmitted by said LED unit,
comparing each light intensity parameter with an intensity
reference value,
determining an intensity control parameter for the LED
unit, based on said comparison,
adjusting the intensity of the light emitted the LED unit
based on the intensity control parameter.

In a possible further embodiment of the method according to the invention, the method comprises the step of determining the intensity reference value based on the light intensity parameters of multiple LED units of the lighting grid.

It should be noted that it is also possible in the method according to the invention that the intensity reference value is a predetermined value.

It should be noted that it is also possible that the method according to the invention comprises the step of determining the intensity reference value based on the overall light.

In a possible further embodiment of the method according to the invention, the method comprises the steps of:
determining with each user equipment device from the
captured light from the LED unit a light colour parameter which represents the colour of the light transmitted
by said LED unit,
comparing each light colour parameter with a colour
reference value
determining a colour control parameter for the LED unit,
based on said comparison,
adjusting the colour of the light emitted the LED unit
based on the colour control parameter.

In a possible further embodiment of the invention the step of determining the colour reference value based on the light colour parameter of multiple LED units of the lighting grid.

It should be noted that it is also possible in the method according to the invention that the colour reference value is a predetermined value.

It should be noted that it is also possible that the method according to the invention comprises the step of determining the colour reference value based on the overall light.

In a possible embodiment of the method according to the invention, the method comprises the steps of:
determining the type and/or instance of each user equipment device with which the light emitted by the LED
unit is captured
adjusting, based on said type and/or instance received
from a user equipment device, at least one of the
following parameters received from or determined
based on information received from said user equipment device:
  i. the VLC quality parameter and/or the VLC control
  parameter; and/or
  ii. the light intensity parameter and/or the intensity
  control parameter; and/or
  iii. the light colour parameter and/or the light colour
  control parameter;

In a possible embodiment of the method according to the invention, the method comprises the steps of:
storing the for the LED unit the determined parameters in
a memory, determining the aging of the LED unit based on the stored parameters, in particular based on the evolution of the parameters over time, informing an operator when to replace the LED unit, based on the determined aging of the LED unit.

It is noted that the method according to the invention can also be applied to operate multiple or even all of the LED units of the lighting grid. Each of the embodiments described above can be applied to each of those LED units.

As will be appreciated by the skilled person, it is also possible to control the intensity and/or colour of the lighting grid without controlling the VLC signal. Therefore according to a second aspect of the invention, the invention further relates to a system, comprising a lighting grid comprising
   a plurality of LED units which are each adapted to emit light in an area wherein a plurality of user equipment devices are present, wherein the light emitted by each LED unit includes a VLC signal, wherein each LED unit is adapted to transmit data to the plurality of user equipment devices via the VLC signal, a controller, which comprises
   a communication terminal for receiving light intensity parameters which each represent the intensity of the light emitted by a LED unit of the lighting grid and/or light colour parameters which each represent the colour of the light emitted by a LED unit of the lighting grid, which light intensity parameters and/or light colour parameters are transmitted by the plurality of user equipment devices,
   a processing unit, which is configured to
   compare each light intensity parameter with an intensity reference value and/or each light colour parameter with an colour reference value, and
   determine an intensity control parameter for each LED unit for which a light intensity parameter has been received and/or colour control parameter for each LED unit light colour parameter has been received, based on said comparison,
wherein the controller is configured to adjust the light emitted by the LED units based on the corresponding intensity control parameter and/or colour control parameter.

In accordance with the second aspect of the invention, a system is provided. The system comprises a lighting grid comprising a plurality of LED units. Each LED unit may comprise one or more LED's, e.g. with a different light colour or intensity. Each LED unit may also comprise one or more LED drivers for driving the LED's. The lighting grid may be in a public or a private environment, such as a house, a supermarket, an office, a museum, a library, or an industrial environment such as a warehouse or a factory. The lighting grid may be spread over one or more spaces or rooms. The LED units of the lighting grid are each adapted to transmit data via a VLC signal, wherein said data optionally comprises at least a code word, e.g. by which the particular LED unit can be identified. The VLC signal is included in the light emitted by the LED unit.

The LED units emit light in an area where there is a plurality of user equipment devices. Each user equipment device is preferably mobile such that it moves around relative to the lighting grid, and it can be any device which comprises a light capturing module, such as a camera, for capturing light emitted by a particular LED unit. Each user equipment device can be a mobile communication device such as a smartphone or tablet, but it can also be an individual physical entity, or it can be incorporated in another device. For example, in a supermarket the user equipment device may be incorporated in a shopping cart or a self-scanning device, in a museum it may be incorporated in a guiding or information device which provides information to the visitor, in an office it may be coupled to an identification tool such as a badge, in a warehouse it may be incorporated in a forklift, autonomous or automatically guided vehicle, or a drone, and in any industrial environment it may be coupled to any tool an operator is obliged to carry for safety or other reasons. The plurality of user equipment devices can include different types of user devices, e.g. multiple of the examples listed above.

Each user equipment device further comprises a processing unit. The processing unit is configured to decode the VLC signals transmitted by the LED units for which the emitted light is captured by the light capturing module. Thus, the user equipment device is configured to receive the VLC signal transmitted by the LED units and decode it, out of the captured light.

The processing unit of each user equipment device is further adapted to determine, for at least one LED unit for which light is captured by the light capturing module, a light intensity parameter and/or a light colour parameter. The light intensity parameter represents the intensity of the light transmitted by the LED unit, and the light colour parameter represents the colour of the light emitted by the LED unit. For example, the processing unit of the user equipment device is adapted to recognize in a captured image a node with higher light intensity, which represents a LED unit, and assign thereto a light intensity parameter and/or a light colour parameter.

The system according to the invention further comprises a controller. The controller may be an individual physical entity, or it may be incorporated in one or more devices which have processing power, such as a computer, print board or a programmable logic controller (PLC). The controller does not need to be on the same physical location as the lighting grid, as is explained in more detail below. The controller according to the invention comprises a communication terminal. Via the communication terminal, the controller is configured to receive the light intensity parameters and/or a light colour parameters transmitted by the user equipment devices, optionally together with the decoded code word. The communication between the user equipment devices and the controller is preferably wireless and may use any suitable technique, such as Wi-Fi, 4G or 3G. If the controller is in the physical vicinity of the user equipment device, communication methods such as Bluetooth, IR wireless communication, VLC or Zigbee can also be used. In some embodiments, a combination of communication techniques may be used, and possibly an intermediate station is used. For example, the user equipment devices may use Bluetooth to send the information to an intermediate computer which is located in vicinity of the lighting grid, which in turn sends the information to the remote controller.

Based on the location of the user equipment device, and/or the decoded VLC signals, and optionally the included code word, the light intensity parameter or light colour parameter can be matched the a LED unit of the lighting grid. The processing unit of said controller is configured to compare the light intensity parameter with an intensity reference value, and based on this determine an intensity control parameter for at least one and preferably each LED unit for which a light intensity parameter has been received and/or to compare the light colour parameter with an colour reference value, and based on this determine an colour control parameter for at least one and preferably each LED unit for which a light colour parameter has been received.

The intensity control parameter and the colour control parameter may be determined based on the current respective parameters as determined by the user equipment devices, but it may also take into previously determined parameters, by the same or by other user equipment devices. As such, a single faulty measurement will not result in an evenly faulty intensity control parameter and/or colour control parameter.

The controller is then configured to control the LED units based on the respective control parameters. The intensity reference value represents a desired intensity for the light emitted by the LED units, and the colour reference value represents a desired colour for the light emitted by the LED units. As such, this embodiment enables to control the intensity and/or colour of the emitted light based on feedback from the user equipment devices. Based on this feedback, the intensity and/or colour of each LED unit can be adapted to converge to the desired value. Since the intensity of the light emitted by the LED unit is dependent on the forward current over the LED unit, the intensity control parameter can represent an adjusted forward current over the LED unit. The colour of a LED unit can be controlled if the LED unit comprises multiple LED's which emit light of a different colour. The colour can then be controlled by controlling the intensity per LED of the LED unit by controlling the forward current over said LED.

In a similar manner as discussed with respect to the first aspect of the invention, the control actions based on the generated control parameters, e.g. the intensity control parameter and the colour control parameter, can be performed in real-time and can be performed in a substantially continuous manner. Because of the use of feedback received from the plurality of user equipment devices during normal operation of the lighting grid, any required adjustment of the intensity or colour of a particular LED unit can be implemented comparatively fast, i.e. once the deviating intensity or colour has been detected and reported by one or more user equipment devices.

In an embodiment, a required adjustment of the intensity or colour of a particular LED unit is implemented once the deviating intensity or colour has been detected and reported by at least a predetermined number of user equipment devices, e.g. 10, in general N. By doing so, any deviations that are caused by the user equipment devices themselves may be alleviated. In an embodiment, a required adjustment of the intensity or colour of a particular LED unit is only implemented when a significant deviating intensity or colour is obtained after averaging of N detected and reported deviating intensity or colour values.

By doing so, the required operating parameters of the lighting grid, e.g. desired intensity and colour, can be maintained within required boundaries substantially continuous; the present invention at least enables that deviations from desired operating values are detected and corrected comparatively fast. In contrast, in case a lighting grid is calibrated at predetermined periodic intervals, e.g. by performing a calibration once a year using dedicated calibration sensors, the deviations of the operating parameters over time may accumulate to much larger values, possibly irritating humans observing the light.

In a possible embodiment according to the second aspect of the invention, the intensity reference value and/or the colour reference value is a predetermined value. As such, the intensity and/or colour of the light can converge to a predetermined desired value.

In a possible embodiment according to the second aspect of the invention, the processing unit of the controller is configured to determine the intensity reference value and/or colour reference value based on the light intensity parameter and/or light colour parameter of multiple LED units of the lighting grid respectively. Thus, the controller first determines the respective parameter of multiple LED units of the lighting grid. Based on this, the respective reference value is determined. It should be noted that the parameters of the other LED units may also be determined by another user equipment device. For example, the intensity reference value may be determined based on the average of the light intensity parameter of multiple LED units. The multiple LED units can be defined as all LED units of the lighting grid, but it is also possible to divide the lighting grids is subgroups, or it is possible to determine an individual set of LED units for determining the respective reference value of each LED unit, wherein the individual set is based on the LED units in the vicinity of the respective LED unit, or any combination of the aforementioned can be applied. It is also possible to detect when the light intensity parameter and/or light colour parameter of a LED unit is an outlier, such that this value can be disregarded when determining the respective reference value.

In a possible embodiment, it is also possible to determine the respective reference value based on the total light captured by one or more of the user equipment devices. Thus, the intensity reference value may represent the average intensity at a certain location, and the colour reference value may represent the average colour at a certain location.

In these embodiments, the light emitted by the LED unit is regulated to be uniform with the other LED units and/or the surrounding light. Thus, a relative uniformity is pursued, meaning that the object is to control the light of any LED unit to be uniform relative to the rest of the present light, rather than controlling the light to pursue an absolute value of intensity and/or colour. Since the reference value in this embodiment is based on the light that is already emitted, this embodiment can be used to regulate the light emitted by the multiple LED units to be uniform, which will be perceived as pleasant by the human observer.

In a possible embodiment according to second aspect the invention, the processing unit of the controller is adapted to detect a subgroup of the LED units of the lighting grid for which the intensity and/or colour control parameter may deviate from the rest of the LED units of the lighting grid. This can for example be desirable for LED units which are located close to a window, through which day light enters. By harvesting the daylight, these LED units can be controlled to have a lower intensity and another colour such that the overall light is perceived as uniform by the human observer. The processing unit may detect such a subgroup based on the geographical position of the LED units, or by detecting that the intensity and/or colour quality parameter of those LED units deviate from the intensity and/or colour reference value respectively.

In a possible embodiment according to the invention, the controller is further adapted to receive from each user equipment device, via the communication terminal, type information representing the model of the user equipment device. The type information can be used pertains to the intensity and/or colour of the emitted light. Each type of user equipment device may have a different result of the measurement of captured light, based again on components and/or software used, resulting in a different light intensity parameter and/or light colour parameter. For example, the intensity of the light according to a certain type of user equipment device may deviate from another type of user equipment device. The processing unit of the controller can then adjusted the light intensity parameter and/or light colour parameter by a weighting factor, wherein the weighting factor is based on the type information. As such, the systematic deviations from the mean behaviour of all user equipment devices, which are based on the design and model of the user equipment device, are taken into account.

In a possible embodiment of the system according to the invention, the controller is further adapted to receive from each user equipment device, via the communication terminal, instance information representing the specimen of the user equipment device. The instance information can be applied in a manner similar to the type information. As such, the stochastic deviations from the mean behaviour of all user equipment devices, which are e.g. based on tolerances of used components in the user equipment device, are taken into account.

The manner in which the type information and/or the instance information is taken into account, i.e. the weighing factors, may be stored in a memory in the controller, or may be provided by communication between the controller and a database, optionally remote. In a possible embodiment, the processing unit controller is adapted to detect, based on type and/or instance information received from the user equipment device, when such information regarding the specific user equipment device is not known or available. The controller is then further adapted to compare the light intensity parameter and/or the light colour parameter with the respective parameters recently determined by other types and/or instances of user equipment devices. The processing unit is then adapted to determine a weighting factor for the unknown type, based on said comparison. This may be adjusted over time as more data determined by said type and/or instance becomes available.

In a possible embodiment of the system according to the second aspect of the invention, the controller further comprises a memory. In said memory, at least one of the light intensity parameter, intensity control parameter, light colour parameter and colour intensity parameter is stored for each LED unit. Based on those stored values, the processing unit is adapted to determine for each LED unit when the LED unit should be replaced. For example, the processing unit can determine a responsivity value. The responsivity value represents the responsivity of said LED unit to one of the control parameters. As such, the processing unit can detect when a LED unit is not responding sufficiently to the control parameter, for example when the LED unit is unable to reach the desired intensity or colour. This may indicate that the LED unit has aged, and must be replaced. As another example, the processing unit can also determine a ratio, e.g. of the light intensity parameter over the current through the LED unit as controlled, or of the light colour parameter over the colour as controlled. Once one or more of these ratios fall below a certain threshold, this may indicate aging of the LED unit.

In a further possible embodiment, the controller is further adapted to then output a signal to an operator representing a replacement order, e.g. via an indication light on a monitor or a notification on an operator information device. This can be done to an operator of the establishment in which the lighting grid is located, or to an operator of a third party which manages the system according to the invention. In the latter case, the replacement order may be represented on a location other than where the lighting grid is located.

In a possible embodiment of the system according to second aspect of the invention, the plurality of user equipment devices are mobile communication devices comprising an installed mobile application. For example, the user equipment devices may be smartphones and/or tables. The mobile application is a software-based application which can run on the mobile communication device.

The mobile application is configured to cause the mobile communication device to capture the light emitted by the LED units with the light capturing module of the mobile communication device, and is further configured to decode the code words transmitted by the LED units for which the emitted light is captured by the light capturing module. Thus, the mobile application is configured to enable the VLC communication from the LED units to the mobile communication device.

The mobile application is further configured to provide information to a user on a display of the mobile communication device. The information is related to an environment wherein the lighting grid is arranged, and the information is based on a determined location of the mobile communication device. Said determined location is determined based on the decoded code words. Thus, based on the decoded code words, it can be determined which of which LED units light is captured by the mobile communication device, and as such the location of the mobile communication device. It is not of importance for the invention whether this location is determined by the processing unit of the mobile communication device or another processing unit, for example of the controller, wherein the code words are transmitted by the mobile communication device to the controller. Based on the determined location, the user of the mobile communication device is provided with information. For example, if the user is in a supermarket, such information can relate to the information or promotions of products in the vicinity, or it can guide the user through the supermarket based on a shopping list. If the user is in a museum, the information can relate to works of art in the vicinity of the user. The information can be stored on the mobile communication device via the mobile application, or it can be provided at that moment, e.g. from a remote database. Communication with such a database can be via conventional wireless communication means such as WiFi Mobile internet such as 3G or 4G, or Bluetooth, but it may also be possible to provide the information via the VLC communication.

The mobile application is further configured to determine for the at least one LED unit the light intensity parameter which represents the intensity of the light emitted by the LED unit and/or a light colour parameter which represents the colour of the light emitted by the LED unit, and cause the mobile communication device to transmit the VLC quality parameter via the output terminal.

In this embodiment, the mobile application is running or the mobile communication device of a user, and provides the user with information. This is the primary function of the mobile application. However, the mobile application is configured to meanwhile determine characteristics of the emitted light, and provide feedback thereof to the controller by transmitting this via the output terminal. As such, the controller can control the LED units appropriately. Since the system comprises a plurality of mobile communication devices, the controller is provided with sufficient real-time information to fine-tune the control of the LED unit. For example, the intensity and/or colour can be controlled to be at the reference values, while in real-time receiving information when a deviation occurs somewhere in the lighting grid. In case aging of components or other factors affect the emitted light, the feedback loop in the system ensures that the controller adjusts for those factors.

Although the system according to the second aspect invention as described so far relates the lighting grid and the controller, in a possible embodiment according to the invention the user equipment devices also are part of the system.

The invention further relates to the mobile application that is installed on the mobile communication device in the aforementioned embodiment. Thus, the invention relates to a mobile application for a mobile communication device, wherein the mobile application is configured to:
- cause the mobile communication device to capture the light emitted by the LED units with the light capturing module of the mobile communication device,
- decode the code words transmitted by the LED units for which the emitted light is captured by the light capturing module,
- provide information to a user on a display of the mobile communication device, wherein said information is related to an environment wherein the lighting grid is arranged, and wherein said information is based on a determined location of the mobile communication device, which determined location is determined based on the decoded code words,
- determine for the at least one LED unit the light intensity parameter and/or the light colour parameter, and
- cause the mobile communication device to transmit the light intensity parameter and/or the light colour parameter via the output terminal.

The second aspect of the invention also relates to a method for operating at least one LED unit of a lighting grid comprising a plurality of LED units, comprising the steps of:
- emitting light with the LED unit including a VLC signal to transmit data via the VLC signal, wherein said data optionally comprises at least a code word by which the particular LED unit can be identified,
- capturing the light emitted by the LED unit with light capturing modules of each of a plurality of user equipment devices,
- decoding with each user equipment device the VLC signal transmitted by the LED unit from the light captured with the light capturing module of the respective user equipment device,
- determining with each user equipment device a light intensity parameter and/or light colour parameter for the LED unit which represents the intensity and/or the colour respectively of the light transmitted by said LED unit,
- assigning the light intensity parameter and/or light colour parameter to the LED unit,
- comparing the light intensity parameter with an intensity reference value and/or the light colour parameter with a colour reference value
- determining an intensity control parameter and/or a colour control parameter for the LED unit, based on said comparison,
- adjusting the light emitted by the LED unit based on the intensity control parameters and/or colour control parameters.

The method according to the second aspect of the invention can optionally be carried out using the system according to second aspect of the invention. The terms used in relation to the method according to the invention therefore have the same meaning as in relation to the system according to the second aspect of the invention.

In a possible embodiment, the method according to the second aspect of the invention further comprises the step of determining the intensity reference value based on the light intensity parameter of multiple LED units of the lighting grid and/or colour reference value based on the light colour parameter of multiple LED units of the lighting grid.

It should be noted that it is also possible in the method according to the second aspect of the invention that the intensity reference value and/or the colour reference value is a predetermined value.

It should be noted that it is also possible that the method according to the second aspect of the invention comprises the step of determining the intensity reference value and/or the colour reference value is based on the overall light.

In a possible embodiment, the method according to the second aspect of the invention further comprises the steps of:
- storing the for at least one and preferably each LED unit the determined parameters in a memory,
- determining the aging of the LED unit based on the stored parameters, in particular based on the evolution of the parameters over time,
- informing an operator when to replace the LED unit, based on the determined aging of the LED unit.

In the figures discussed below, possible embodiments of the invention are shown. It should be noted that these figures serve as examples, and are in no way limiting to the scope of the invention. Like reference numbers are used for like features across various figures.

DETAILED DESCRIPTION OF THE INVENTION

Figure 1:
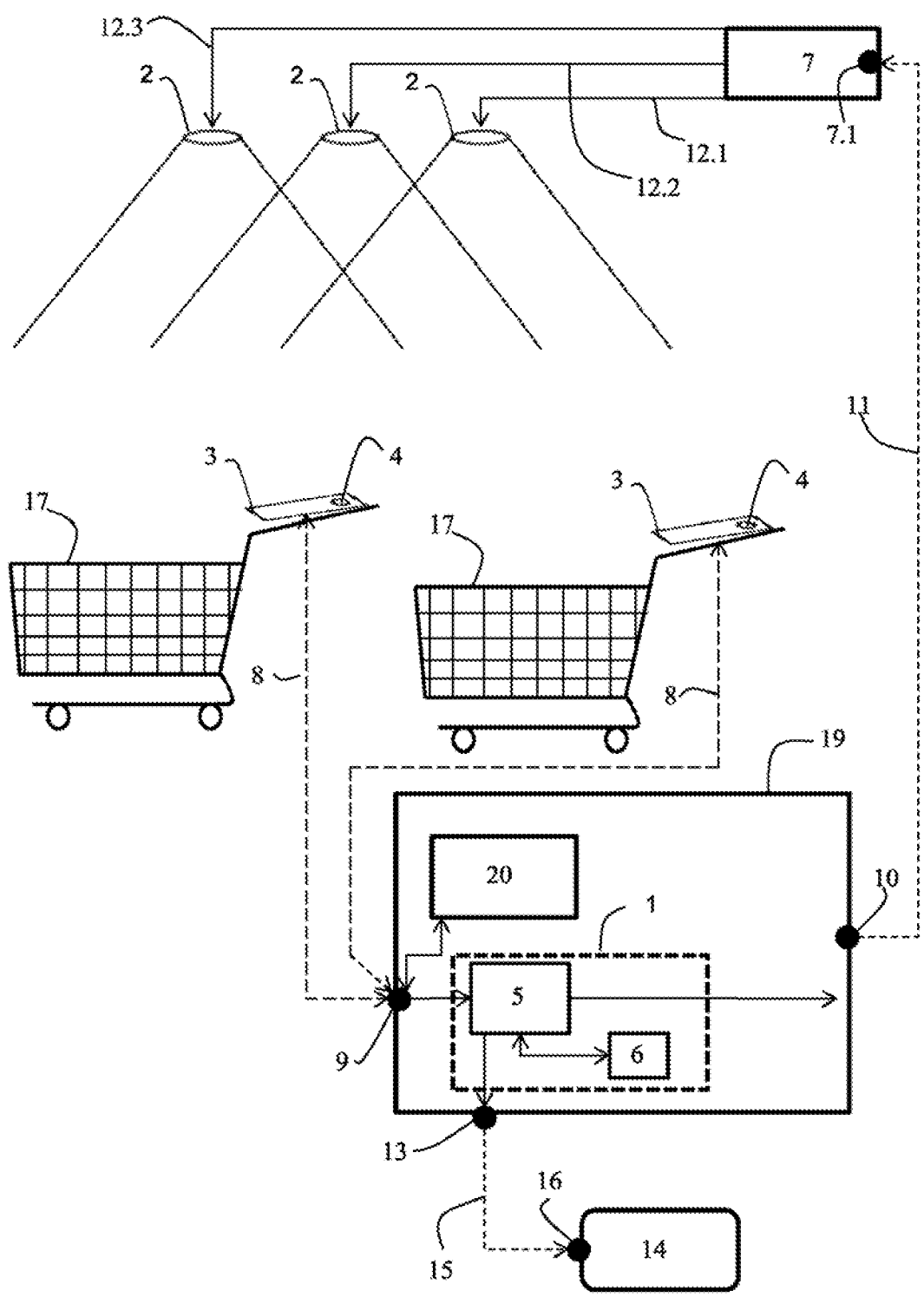
FIG. 1: shows a possible embodiment of a system according to the invention.

FIG. 1 shows a schematic view of a possible embodiment of a system according to the invention, and some of the things it can optionally interact with. In FIG. 1, three LED units 2 are shown that are part of a lighting grid to illustrate the working principle. However, the lighting grid may comprise any number of LED units 2. In this example, the lighting grid is located in a supermarket. The customer can use a shopping cart 17, which is provided with a space to position a user equipment device 3, which can be for example a smartphone or a tablet. In FIG. 1, there are two shopping carts 17 depicted, with each a user equipment device 3 arranged thereon. Each user equipment device 3 comprises a light capturing module 4, for capturing the light that is emitted by the LED units 2. The light emitted by the LED units 2 comprises a VLC signal via which data is transmitted, in this example a code word. Each LED unit 2 transmits a different code word, which allows identifying of the particular LED unit 2.

On the user equipment devices 3, an application is installed and running which provides the customer with information regarding the supermarket and/or the items in the supermarket. For this, the user equipment devices 3 are in communication with a supermarket information system 19. In FIG. 1, this communication is via WiFi and schematically shown by the double arrow indicated by reference number 8. However, any other suitable communication method could be used as well. The supermarket information system 19 has a communication terminal 9 to receive the data. Each user equipment device 3 is adapted, by the application running on it, to decode the VLC signal in the light emitted by the LED unit 2. Thus, the user equipment devices 3 decode the code word, which can be used to identify from which LED unit 2 the user equipment device 3 is capturing light and receiving data.

The user equipment devices 3 comprise an output terminal (not shown), via which it then communicates the code words it decoded to the supermarket information system 19, which comprises a customer application system 20, which determines based on the code words where in the supermarket the customer is located. Based on this, the customer application system 20 communicates information back to the user equipment devices 3, which may cause the application to show the customer information, e.g. based on the customers shopping list, or special promotions for the products in the vicinity of the customer.

In the shown example, a controller 1 is incorporated in the supermarket information system 19. However, it should be noted that this is merely to show an example of a possible application of the invention. The controller 1 can be a stand-alone system, and it can be useful in many other locations. Furthermore, the exact working of the customer application system 20 and the interaction between this system and the user equipment devices 3 are not essential for the actual invention.

The controller 1, which in this example is incorporated by the supermarket information system 19, also receives the code words which have been decoded by the user equipment device, via the communication terminal 9. In should be noted that if the controller 1 is a stand-alone system, it also comprises the required terminals, such as the communication terminal 9. The controller 1 further comprises a processing unit 5, and in the shown example also a memory 6.

In the shown example, the LED units 2 are configured to transmit their particular code word repeatedly. When the light capturing module 4 of one of the user equipment devices 3 captures the light emitted by a particular LED unit 2, it thus receives the code word repeatedly. Each user equipment device 3 comprises a processing unit (not shown), which is configured, e.g. by the application running on it, to determine a VLC quality parameter for said particular LED unit 2. In the shown example, the VLC quality parameter is based on the frequency that the processing unit of the user equipment device 3 is able to successfully decode the code word transmitted by the LED unit 2. Thus, the higher the VLC quality parameter is, the more often the user equipment device 3 is able to successfully decode the code word emitted by a particular LED unit 2.

Each user equipment device 3 is further configured to transmit this VLC quality parameter, via the output terminal of the user equipment device 3 and the communication terminal 9, to the controller 1. The processing unit 5 is configured to determine a VLC control parameter for the particular LED unit 2, based on the VLC quality parameters it has received from the user equipment devices. The controller 1 adjusts the modulation depth of the VLC signal transmitted by the LED unit 2 via the VLC control parameter, which is explained in more detail with reference to FIG. 2a and FIG. 2b. Note that, in order to prevent that excessive amounts of data need to be stored, the processor may be configured to condense the received information or data, e.g. by calculating averages or other cumulative data from the information or data and only storing the calculated data. In an embodiment, the processor may also disregard data that was received more than a predetermined period ago, e.g. more than one month, thereby only using the most recently received information or data to determine the VLC control parameters.

Figure 2A:
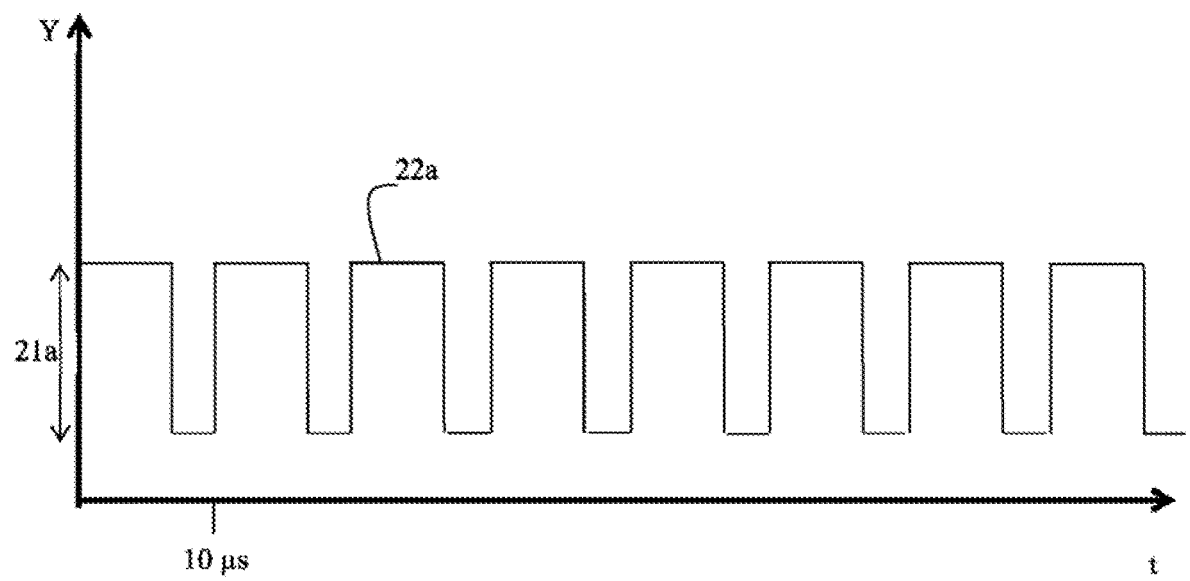
FIG. 2a-2b: show an example of a code word in a VLC signal.
Figure 2B:
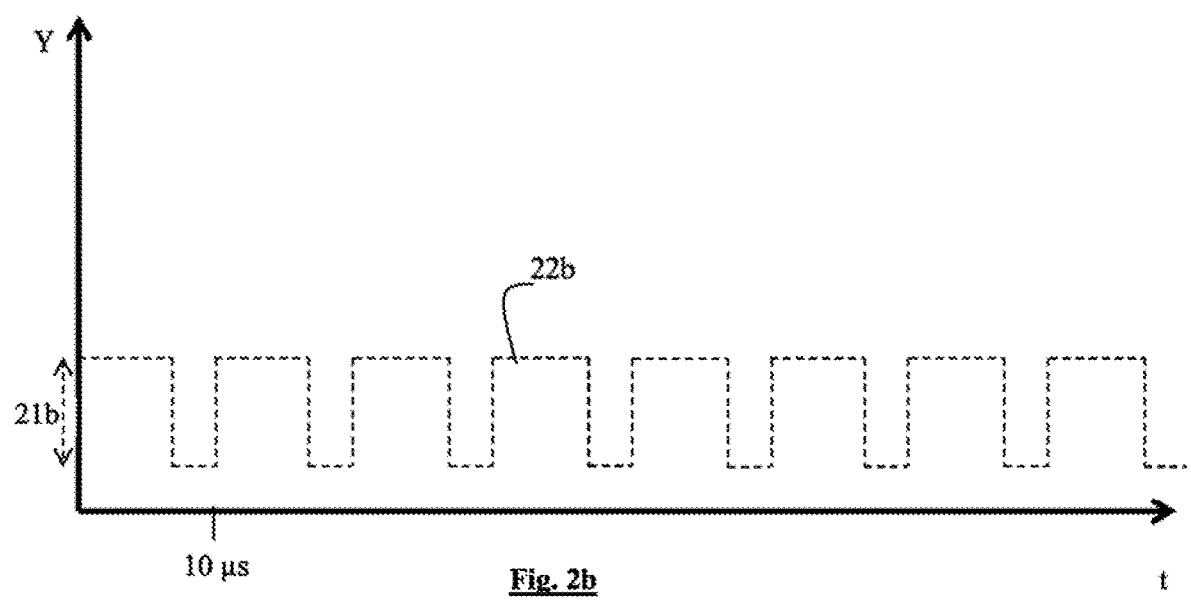

In FIG. 2a, the intensity of the light emitted over a short period of time by a particular LED unit 2 is shown, wherein the time is indicated on the horizontal axis, and the intensity on the vertical axis. The change in intensity by the emitted light represents the VLC signal, which is used to transmit the code word 22a. In the shown example, the code word of the particular LED unit consist of eight high signals of the same time length, each followed by a low level of a shorter time length. In the shown example, the high level and the low level together last 10 μs. The difference in intensity of the high level as compared to the low level is the modulation depth 21a. In FIG. 2a, the modulation depth 21a is relatively large. The larger the modulation depth 21a is, the easier it is for the user equipment devices 3 in FIG. 1 to decode the code word transmitted by the LED unit 2 in the VLC signal, since the difference between the high level and the low level is easier to recognize. Note that factors such as surrounding light and components of the user equipment devices 3 influence the ability to recognize the code word. Thus, when the modulation depth 21a is large, the quality of the transmission of data via the VLC signal is relatively high. Hence, the processing unit of each user equipment device 3 will determine the VLC quality parameter relatively high. However, the higher the modulation depth is, the higher the current through the LED unit 2 must be to achieve the high level of the intensity of the emitted light, or at least the larger the difference between the high level current and the low level current must be. This will lead to more energy consumption, and faster aging of the LED unit 2 and other components. Therefore, the processing unit 5 of the controller 1 of FIG. 1 can determine the VLC control parameter such that the modulation depth 21a is decreased, for example to modulation depth 21b in FIG. 2b. As can be seen, the code word 22b will be recognized in the same way as code word 22a by the user equipment devices 3, since the sequence of high and low levels is still the same. However, the average intensity of the emitted light is lower, and therefore also the energy consumption and wear of the components. The processing unit 5 of the controller 1 of FIG. 1 is configured to control the LED unit 2 such that the modulation depth is decreased, as long as the VLC quality parameter as determined by each user equipment device 3 is above a minimal level. However, when the VLC quality parameter is too low, e.g. when one or more of the user equipment devices 3 cannot decode the code word, or, when a certain percentage of the user equipment devices 3 cannot decode the code word, the modulation depth may be increased. The minimal level for any user equipment device 3 is determined such that the user equipment device 3 is still able to successfully decode the code word to positively recognize it. For example, this may mean that it recognizes the code word more than half of the time.

Referring back to FIG. 1, the controller 1 is, via an output terminal 10, in communication with a LED control unit 7. The LED control unit 7 controls the LED units 2 by a control signal 12.1, 12.2, 12.3 that is specific for each LED unit 2, and based on the VLC control parameter which the LED control unit 7 receives via its input terminal 7.1 from the controller 1. It should be noted that the function LED control unit 7 can be embodied in many various ways. For example, the controller 1 could be in direct communication with a driver or control unit for each specific LED unit 2, or the LED control unit 7 can be incorporated in the controller 1 itself.

As explained above, the controller 1 determines the modulation depth via VLC control parameter such that the VLC signal is still decodable both the user equipment devices 3 shown in FIG. 1. However, the ability of any user equipment device 3 to decode the VLC signal is usually dependent on the characteristics of said user equipment device 3. For example, smartphones or tablets of a certain make may require a higher modulation depth than others, and this may even vary among models of a certain make. Therefore, in the example shown in FIG. 1, each user equipment device 3 is configured to provide the controller 1 with information that allows to recognize the type of user equipment device 3. The processing unit 5 of the controller 1 is configured to determine the VLC control parameter such that the code word can be decoded by all, or at least as many as possible, types of user equipment devices 3. To do so, the VLC quality parameter as determined by each user equipment device 3 is adjusted by a weighing factor before the VLC control parameter is determined, wherein the weighing factor is dependent on the type of user equipment device 3. The minimal level of the VLC quality parameter is such that at the predetermined level a predetermined percentage of user equipment devices is able to decode the code word, wherein the predetermined percentage preferably is at least 90%, more preferably at least 95%. By not pursuing that 100% of the user equipment devices is able to decode the code word, it is prevented that an outlier, e.g. because of a faulty component in, or measurement by, a single user equipment device, affects the modulation depth.

In the shown example, the processing unit of each user equipment device 3 is further configured to determine a flicker value of the light emitted by the LED unit 2. Flicker may occur as a consequence of the VLC signal, for example because the difference between the high level and the low level in intensity of the emitted light is too large, or because the changes in high level and low level are in a frequency range that is visible. In case the flicker becomes visible to the human eye, this will be perceived as unpleasant. Thus, the flicker value represents the change in intensity of the emitted light and the frequency thereof. The flicker value is transmitted from the user equipment devices 3 to the controller 1, and taken into account when determining the VLC control parameter. In other words, when the flicker value is such that the flicker becomes visible to the human eye, to processing unit 5 of the controller 1 adjusts the modulation depth to be smaller, or adjusts the frequency of the changes from high level and low level such that they are not, or at least less, visible to the human eye.

Figure 3:
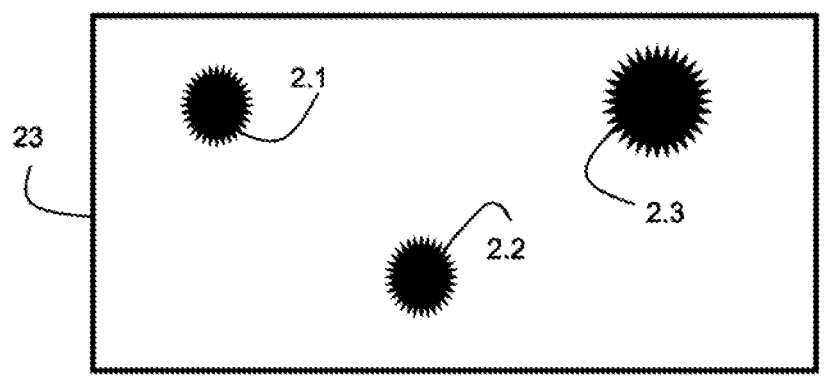
FIG. 3: shows a captured image with a user equipment device including three LED units.

The system shown in FIG. 1 is further configured to control the intensity and colour of the light emitted by the LED units 2. It should be noted, however, that this function can also be performed without controlling the modulation depth at the same time. FIG. 3 shows a simplified captured image 23, which is captured by the light capturing module 4 of one of the user equipment devices 3 in FIG. 1. In the captured image 23, the three LED units 2.1, 2.2, 2.3, are captured. LED unit 2.3 is depicted larger in the captured image, meaning that more light is captured from LED 2.3, and that the intensity of the light emitted by LED unit 2.3 is larger than by the other LED units 2.1, 2.2. This may be perceived as unpleasant by the customer. The controller 1 is therefore configured to control the intensity of the light emitted by the LED units 2 in order to pursue a uniform light. The processing unit of the user equipment device 3 is configured to determine a light intensity parameter for each LED unit 2 captured in the captured image 23, based on said captured image.

Based on the nodes with high intensity in the captured image, the user equipment device 3 can determine that a LED unit 2 is located on a certain node, and determine a corresponding light intensity parameter. It should be noted that the light intensity parameter can be matched to a particular LED unit 2 based on the code words that the user equipment device 3 decodes, as the precise location of the user equipment device 3 can be determined from that. It is irrelevant for the invention whether said matching is done by the processing unit of the user equipment device 3 or the processing unit 5 of the controller 1. The controller 1 stores the light intensity parameters in its memory 6.

The processing unit 5 of the controller compares the light intensity parameter to an intensity reference value. The intensity reference value could be a predetermined value, when a specific intensity is pursued. In this example however, the intensity reference value is based on the light intensity parameter of the other LED units 2.

Figure 4:
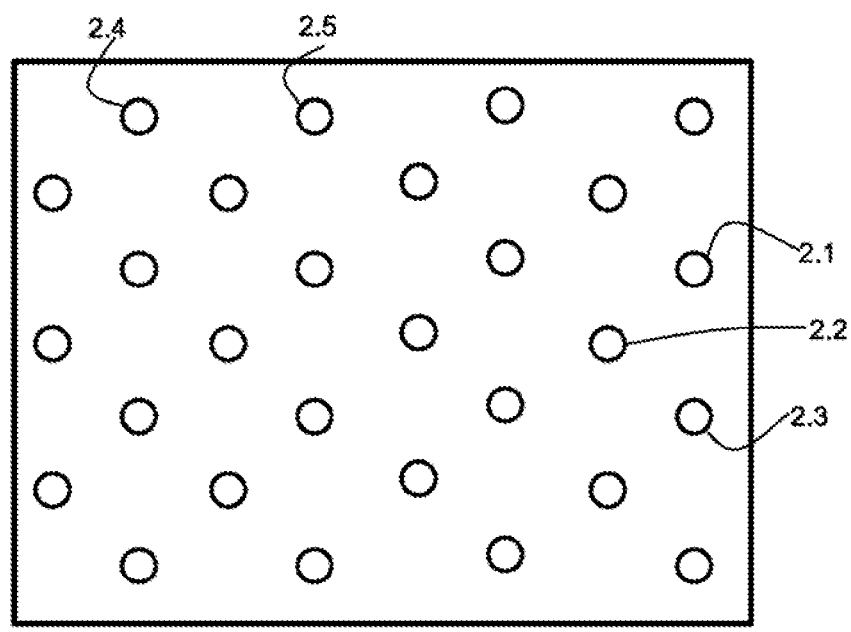
FIG. 4: shows a lighting grid comprising a plurality of LED units.

FIG. 4 schematically shows the lighting grid for which the LED units 2.1, 2.2, 2.3 of FIG. 3 are part of, which in this example is applied in one open space. The object of the controller 1 is to pursue a uniform intensity of light in this open space. Therefore, the intensity reference value is determined by taking an average of the all the light intensity parameters of the LED units 2 of which a sufficiently recent measurement is available. However, in case a single light intensity parameter deviates relatively much from the average, it may be disregarded, since it may be a faulty measurement or there may be another issue with the LED unit 2.

Based on the comparison of the light intensity parameter with the intensity reference value, the processing unit 5 of the controller 1 of FIG. 1 determines an intensity control parameter for the particular LED unit 2. The intensity control parameter is such that the light intensity parameter of that LED unit 2 will converge to the intensity reference value. Taking the example of FIG. 3, the intensity control parameter of LED unit 2.3 will be such that LED unit 2.3 is to emit light with a lower intensity. To do so, the control signal 12.3 for LED unit 2.3 will entail a lower current though the LED unit 2.3.

Referring back to FIG. 1, the controlling of the intensity of the light emitted by a LED unit 2 is accomplished similarly to the controlling of the modulation depth, i.e. by communicating the intensity control parameter via output terminal 10 to the LED control unit 7, via input terminal 7.1. The LED control unit 7 controls the LED units 2 by a control signal 12.1, 12.2, 12.3 that is specific for each LED unit 2.

In reality, each user equipment device 3 may assign a slightly different light intensity parameter to the captured light, due to variations in the used components and/or software. Therefore, in the example shown in FIG. 1, each user equipment device 3 is configured to provide the controller 1 with information that allows to recognize the type of user equipment device 3. Based on the type of user equipment device 3, the processing unit 5 of the controller 1 is then configured to adjust the light intensity parameter by a weighing factor, which is stored in the memory 6. In case there is no weighing factor available for a certain type of user equipment device 3, e.g. because it pertains a type that is new to the market, the controller 1 is adapted to compare the light intensity parameter to the light intensity parameter for the same LED unit 2 recently determined by other user equipment devices 3. Based on this, the processing unit 5 determines how much the light intensity parameter of the new user equipment 3 device deviates from others, and as such make a first estimation for an appropriate weighing factor for the new user equipment device 3. This weighing factor can be adjusted over time as more measurements of the same type of user equipment device 3 are available. It should be noted that the controller 1 can be in connection with a central database (not shown), wherein the weighing factors can be determined based on measurements over various physical locations and controllers 1, which are then communicated to the controller 1 and stored in the memory 6. It is also possible to communicate the weighing factors in real time, such that they do not need to be stored in the memory 6.

In the shown embodiment, the processing unit 5 of the controller 1 is further configured to detect when multiple LED units 2 that are located in each other's vicinity deviate from the intensity reference value. Referring now to FIG. 4, wherein the intensity of the light in the region that is illuminated by LED units 2.4, 2.5 is higher than the intensity reference value. This may be the case for example if they are located next to a window, where sunlight is coming through. Such a deviation in intensity can be experienced as unpleasant by the costumers. The controller 1 will therefore determine the intensity control parameter of LED units 2.4 and 2.5 in order to lower the intensity of the light emitted by those LED units 2.4, 2.5, such that the overall intensity of the light, which is a combination of the incoming sunlight and the light emitted by the LED units 2.4, 2.5, corresponds with the intensity reference value. Of course, the amount of daylight that can be harvested depends on exterior factors such as the cloudiness and the time of day, meaning that intensity control parameter of LED units 2.4 and 2.5 also varies over time.

The controller 1 according to the shown embodiment is further adapted to control the colour of the light emitted by the LED units 2. Referring back to FIG. 3, wherein the user equipment device 3 had captured three LED units 2.1, 2.2, 2.3 in the captured image 23. Besides the light intensity parameter, the processing unit of the user equipment device 3 in the shown embodiment is configured to assign a light colour parameter to each LED unit 2.1, 2.2, 2.3. The light colour parameter in the shown example is according to a RGB-coding, wherein a RED-value, a GREEN-value and a BLUE-value are assigned. However, any other suitable colour coding method can be used as well. The working principle of the user equipment device 3 and the controller 1 for controlling the colour is very similar to controlling the intensity. The light colour parameter is compared to a colour reference value, based on which a colour control parameter for particular LED unit 2 is determined. The colour reference value is determined similarly to the intensity reference value.

Also similarly to the intensity control, a weighing factor is applied based on the type of user equipment device 3, and the colour control parameter may be adjusted based on external factors such as daylight. It should be noted that it is possible, depending on the user equipment device 3, that a weighing factor is applied for only of the colours, e.g. only for the RED value.

To adjust the colour of the light emitted by the LED unit 2, the LED unit 2 comprises multiple LED's of different colours. As such, to adjust the colour, the intensity of one or more of those LED's of the LED unit 2 may be adjusted by adjusting the current through it.

Figure 5A:
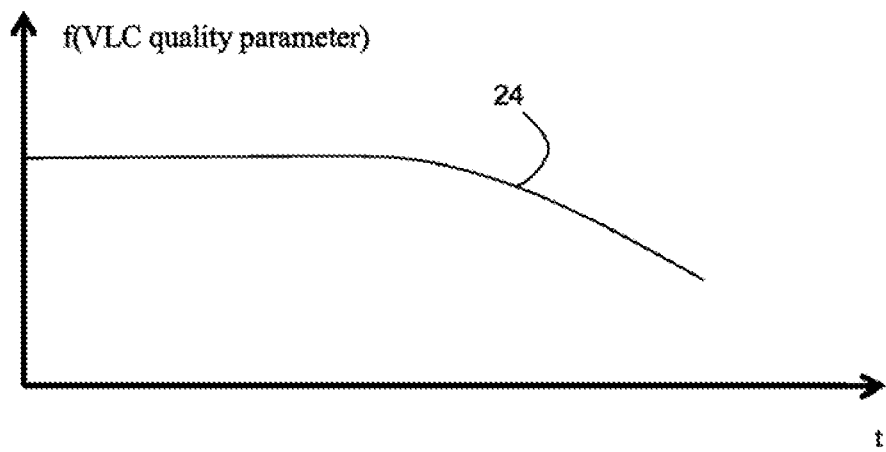
FIG. 5a: shows a value which is a function of the VLC quality parameter over time.
Figure 5B:
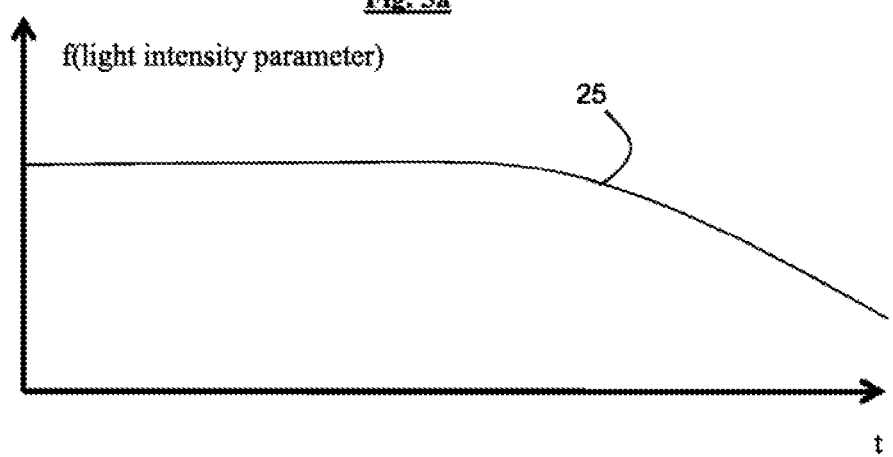
FIG. 5b: shows a value which is a function of the light intensity parameter over time.
Figure 5C:
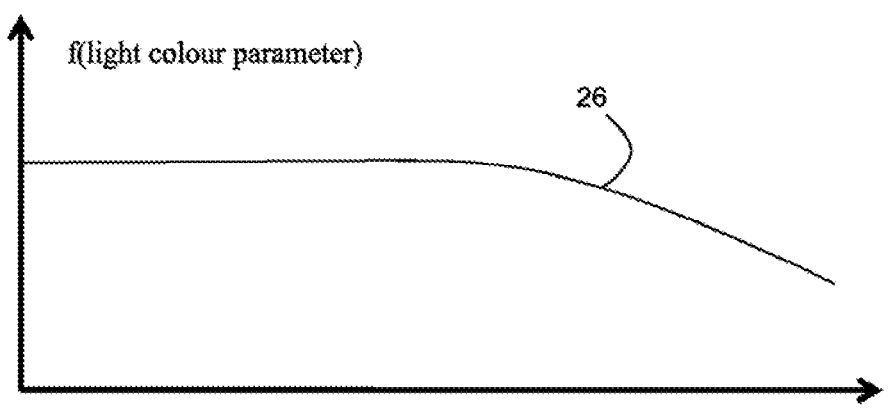
FIG. 5c: shows a value which is a function of the light colour parameter over time.

FIG. 5a-5c each respectively show a graph of the behaviour of one LED unit 2 over time, which can be stored in the memory 6. FIG. 5a shows on the vertical axis a value which is function of the VLC quality parameter, in this example the ratio of the determined VLC quality parameter of the respective LED unit 2 over the modulation depth of the VLC signal as controlled by the controller 1. The graph 24 of this function after a certain period of time starts declining. This may be due to aging and indicate that the LED unit 2 is not capable any longer to transmit the modulation depth as required. Once the graph 24 falls below a threshold, this may indicate that the LED unit 2 needs replacement.

Said threshold can be a predetermined value, but it can also be determined based on the feedback of the user equipment devices, in that the threshold can represent the lowest value required such that all user equipment devices can decode the VLC signal.

FIG. 5b shows on the vertical axis a value which is a function of the light intensity parameter, in this example the ratio of the light intensity parameter over the current flowing through the LED unit 2. The graph 25 of this function after a certain period of time starts declining, e.g. due to aging. Once the graph 25 falls below a certain predetermined threshold, this may indicate that the LED unit 2 needs replacement.

FIG. 5c shows on the vertical axis a value which is a function of the light colour parameter, in this example the ratio of the light colour parameter over the current flowing through the LED's of the LED unit 2. The graph 26 of this function after a certain period of time starts declining, e.g. due to aging. Once the graph 26 falls below a certain predetermined threshold, this may indicate that the LED unit 2 needs replacement.

Thus, the processing unit 5 of the controller 1 is configured to determine based on the graphs 24, 25, 26 according to FIG. 5a-5c if any LED unit 2 needs replacement. Referring now back to FIG. 1, wherein the supermarket information system 19 comprises a second output terminal 13. From this second output terminal 13, the controller 1 is in communication, indicated schematically by line 15, with an input terminal 16 of an operator information device 14. In this example, the operator information device 14 comprises a screen. The controller 1 is configured, when it determines that a LED unit 2 needs replacement, to output a signal representing a replacement order, which is visualized on the screen of the operator information device 14. As such, the operator knows when to replace which LED unit 2. It should be noted that in this case the operator can mean an operator of the supermarket, wherein the operator information device 14 can be located in the supermarket, or in can mean an operator of another company which is in control of service of the lighting system of the supermarket, wherein the operator information device 14 is located where it is available to said operator.

The invention claimed is:

1. A system, comprising
a lighting grid comprising
a plurality of LED units which are each adapted to emit light in an area wherein a plurality of user equipment devices are present, wherein the light emitted by each LED unit includes a VLC signal, wherein each LED unit is adapted to transmit data to the plurality of user equipment devices via the VLC signal,
a controller, which comprises
a communication terminal for receiving VLC quality parameters transmitted by the plurality of user equipment devices, wherein each VLC quality parameter corresponds with a LED unit of the plurality of LED units and represents the quality of data transmission via the VLC signal transmitted by that LED unit, a processing unit, which is configured to determine a VLC control parameter for at least one LED unit for which multiple VLC quality parameters have been received, based on the corresponding multiple VLC quality parameters, wherein the controller is configured to adjust a VLC signal transmitted by the at least one LED unit based on the corresponding determined VLC control parameters, wherein the multiple VLC quality parameters are received from multiple equipment devices, and wherein the multiple VLC quality parameters are received over a period of time.

2. System according to claim 1, wherein the multiple VLC quality parameters are received during normal use of the lighting grid.

3. System according to claim 1, wherein the processing unit is configured to update the VLC control parameter of the at least one LED unit when a further or next VLC quality parameter has been received.

4. System according to claim 1, wherein the controller is further configured to receive, via the communication terminal, from each user equipment device an operating parameter characterizing the light emitted by a LED unit and wherein the processing unit of the controller further is configured to determine the VLC control parameter such that the operating parameter is within a predetermined range or below a predetermined level, and wherein the operating parameter comprises at least one of a flicker value, an intensity or a colour.

5. System according to claim 4, wherein the controller is configured to control a modulation depth of the VLC signal based on the VLC control parameter.

6. System according to claim 5, wherein the controller is configured to minimize the modulation depth of the VLC signal while maintaining the quality of the transmission of data via the VLC signal as represented by the VLC quality parameter above a predetermined level.

7. System according to claim 1, wherein each LED unit transmits in the data in the VLC signal at least a code word, wherein optionally the particular LED unit can be identified by the code word it transmits, wherein the LED units are configured to transmit the code words repeatedly, and wherein the VLC quality parameter is based on a frequency of successful decoding of the code word.

8. System according to claim 1, wherein the VLC signal transmitted by each LED unit comprises a modulation depth, and wherein the controller is configured to control said modulation depth by the VLC control parameter.

9. System according to claim 8, wherein the processing unit of the controller is configured to determine the VLC control parameter such that the modulation depth of the VLC signal is minimized while maintaining the quality of the transmission of data via the VLC signal as represented by the VLC quality parameter above a predetermined level, wherein at the predetermined level a predetermined percentage of user equipment devices is able to decode the code word, wherein the predetermined percentage preferably is at least 90%, more preferably at least 95%.

10. System according to claim 8, wherein the controller further is configured to receive, via the communication terminal, from each user equipment device a flicker value for the light emitted by a LED unit, and wherein processing unit of the controller further is configured to determine the VLC control parameter such that the flicker value is below a predetermined level that represents the visibility of flicker to a human eye and/or to a camera.

11. System according to claim 1, wherein
the controller further is configured to receive, via the communication terminal, from each user equipment device for at least one LED unit a light intensity parameter which represents the intensity of the light emitted by said LED unit, and the processing unit of the controller is configured to
compare the light intensity parameters with an intensity reference value, determine an intensity control parameter for at least one LED unit for which a light intensity parameter has been received, based on said comparison, wherein the controller is configured to adjust the intensity of the light emitted the LED unit based on the corresponding intensity control parameters.

12. System according to claim 11, wherein the intensity reference value is a predetermined value.

13. System according to claim 11, wherein the processing unit of the controller is configured to determine the intensity reference value based on the light intensity parameters of multiple LED units of the lighting grid.

14. System according to claim 11, wherein
the controller further is configured to receive, with the communication terminal, from each user equipment device for at least one LED unit a light colour parameter which represents the colour of the light transmitted by said LED unit, and the processing unit of the controller is configured to
compare the light colour parameters with a colour reference value, determine an colour control parameter for at least one LED unit for which a light colour parameter has been received, based on said comparison, wherein the controller is configured to adjust the colour of the light emitted by the LED units based on the corresponding colour control parameters.

15. System according to claim 14, wherein the colour reference value is a predetermined value.

16. System according to claim 14, wherein the processing unit of the controller is configured to determine the colour reference value based on the light colour parameters of multiple LED units of the lighting grid.

17. System according to claim 14, wherein the controller further receives type information, and optionally instance information, for each user equipment device, wherein the processing unit of the controller is adapted to adjust at least one of the
the VLC quality parameter and/or the VLC control parameter; and/or
the light intensity parameter and/or the intensity control parameter; and/or
the light colour parameter and/or the colour control parameter;
received from or determined based on information received from each the user equipment devices based on the type information and/or the instance information received for said user equipment device.

18. System according to claim 14, wherein
the controller further comprises a memory wherein for the LED units the parameters determined by the user equipment devices and/or the parameters determined by the processing unit of the controller are stored, and
the processing unit of the controller is configured to determine the aging of at least one LED unit of the lighting grid based on the stored parameters, in particular based on the evolution of the parameters over time, and the controller is adapted to output a signal to an operator representing a replacement order for the LED unit based on the aging of said LED unit.

19. System according to claim 14, further comprising the plurality of user equipment devices, each user equipment device comprising a light capturing module for capturing the light emitted by the LED units of the lighting grid, a processing unit, which is configured to determine for at least one LED unit the VLC quality parameter which represents the quality of the transmission of data via the VLC signal transmitted by said LED unit, and an output terminal for transmitting the VLC quality parameter.

20. System according to claim 19, wherein the processing unit of each user equipment device further is configured to, when applicable:

decode the code word transmitted by the LED unit and determine the VLC quality parameter based on the frequency of successful decoding of the code word; and/or determine the flicker value for the light emitted by a LED unit; and/or determine for at least one LED unit the light intensity parameter which represents the intensity of the light emitted by said LED unit; and/or determine for at least one LED unit the light colour parameter which represents the colour of the light transmitted by said LED unit;

and wherein the output terminal of each user equipment device is adapted to transmit the determined parameters.

21. System according to claim 19, wherein the plurality of user equipment devices are mobile communication devices comprising an installed mobile application, wherein said mobile application is configured to cause the mobile communication device to capture the light emitted by the LED units with the light capturing module of the mobile communication device, decode the code words transmitted by the LED units of which the emitted light is captured by the light capturing module, provide information to a user on a display of the mobile communication device, wherein said information is related to an environment wherein the lighting grid is arranged, and wherein said information is based on a determined location of the mobile communication device, which determined location is determined based on the decoded code words, determine for the at least one LED unit the VLC quality parameter which represents the quality of the transmission of data via the VLC signal transmitted by said LED unit, and cause the mobile communication device to transmit the VLC quality parameter via the output terminal.

22. A mobile application for a mobile communication device for use in the system according to claim 1, wherein the mobile application is configured to:

cause the mobile communication device to capture a light emitted by at least one of the LED units with a light capturing module of the mobile communication device, decode code words transmitted by the at least one LED unit from which the emitted light is captured by the light capturing module, provide information to a user on a display of the mobile communication device, wherein said information is related to an environment wherein the lighting grid is arranged, and wherein said information is based on a determined location of the mobile communication device, which determined location is determined based on the decoded code words, determine for the at least one LED unit a VLC quality parameter which represents the quality of the transmission of data via the VLC signal transmitted by the at least one LED unit, and cause the mobile communication device to transmit the VLC quality parameter via an output terminal of the mobile communication device to the controller of the system.

23. A method for operating at least one LED unit of a lighting grid comprising a plurality of LED units, comprising the steps of:

emitting light with the LED unit including a VLC signal to transmit data via the VLC signal, capturing the light emitted by the LED unit with light capturing modules of a plurality of user equipment devices, decoding with each user equipment device the VLC signal transmitted by the LED unit from the light captured by the light capturing module of the particular user equipment device, determining with each user equipment device for the LED unit a VLC quality parameter which represents the quality of the transmission of data via the VLC signal transmitted by said LED unit, determining a VLC control parameter for the LED unit, based on said VLC quality parameters, wherein the multiple VLC quality parameters are received from multiple equipment device, and wherein the multiple VLC quality parameters are received over a period of time, adjusting the VLC signal transmitted by the LED unit based on the VLC control parameter.

24. Method according to claim 23, further comprising the steps of:

transmitting a code word repeatedly in the VLC signal included in light emitted by the LED unit, determining the VLC quality parameter for the LED unit based a frequency of successful decoding of the respective code word by the particular user equipment device, determining the VLC control parameter such that a modulation depth of the VLC signal is minimized while maintaining the quality of the transmission of data via the VLC signal as represented by the VLC quality parameter above a predetermined level, wherein at the predetermined level a predetermined percentage of user equipment devices is able to decode the code word, wherein the predetermined percentage preferably is at least 90%, more preferably at least 95%.

25. Method according to claim 23, further comprising the step of determining a flicker value for the light emitted by the LED unit, and wherein the step of determining the VLC control parameter is further based on the flicker value, such that the flicker value is below a predetermined level that represents the visibility of flicker to a human eye and/or to a camera.

26. System, comprising a lighting grid comprising a plurality of LED units which are each adapted to emit light in an area wherein a plurality of user equipment devices are present, wherein the light emitted by each LED unit includes a VLC signal, wherein each LED unit is adapted to transmit data to the plurality of user equipment devices via the VLC signal,
a controller, which comprises
- a communication terminal for receiving VLC quality parameters transmitted by the plurality of user equipment devices, wherein each VLC quality parameter corresponds with a LED unit of the plurality of LED units and represents the quality of data transmission via the VLC signal transmitted by that LED unit,
- a processing unit, which is configured to determine a VLC control parameter for at least one LED unit for which multiple VLC quality parameters have been received, based on the corresponding multiple VLC quality parameters, wherein the controller is configured to adjust a VLC signal transmitted by the at least one LED unit based on the corresponding determined VLC control parameters, wherein the VLC signal transmitted by each LED unit comprises a modulation depth, and wherein the controller is configured to control said modulation depth by the VLC control parameter, wherein the processing unit of the controller is configured to determine the VLC control parameter such that the modulation depth of the VLC signal is minimized while maintaining the quality of the transmission of data via the VLC signal as represented by the VLC quality parameter above a predetermined level, wherein at the predetermined level a predetermined percentage of user equipment devices is able to decode the code word, wherein the predetermined percentage preferably is at least 90%, more preferably at least 95%.

27. Method for operating at least one LED unit of a lighting grid comprising a plurality of LED units, comprising the steps of:
- emitting light with the LED unit including a VLC signal to transmit data via the VLC signal, capturing the light emitted by the LED unit with light capturing modules of a plurality of user equipment devices,
- decoding with each user equipment device the VLC signal transmitted by the LED unit from the light captured by the light capturing module of the particular user equipment device,
- determining with each user equipment device for the LED unit a VLC quality parameter which represents the quality of the transmission of data via the VLC signal transmitted by said LED unit,
- determining a VLC control parameter for the LED unit, based on said VLC quality parameters,
- adjusting the VLC signal transmitted by the LED unit based on the VLC control parameter, transmitting a code word repeatedly in the VLC signal included in light emitted by the LED unit,
- determining the VLC quality parameter for the LED unit based a frequency of successful decoding of the respective code word by the particular user equipment device,
- determining the VLC control parameter such that a modulation depth of the VLC signal is minimized while maintaining the quality of the transmission of data via the VLC signal as represented by the VLC quality parameter above a predetermined level, wherein at the predetermined level a predetermined percentage of user equipment devices is able to decode the code word, wherein the predetermined percentage preferably is at least 90%, more preferably at least 95%.

* * * * *